(12) United States Patent
Bouwer et al.

(10) Patent No.: US 9,709,136 B2
(45) Date of Patent: Jul. 18, 2017

(54) AIRCRAFT AND PLANETARY GEAR SYSTEMS

(71) Applicant: The Boeing Company, Huntington Beach, CA (US)

(72) Inventors: Scott Hendrik Bouwer, Wilmington, DE (US); Christopher C. Pierce, Philadelphia, PA (US); Mark Joseph Robuck, Chadds Ford, PA (US)

(73) Assignee: The Boeing Company, Chicago, IL (US)

( * ) Notice: Subject to any disclaimer, the term of this patent is extended or adjusted under 35 U.S.C. 154(b) by 24 days.

(21) Appl. No.: 14/721,803

(22) Filed: May 26, 2015

(65) Prior Publication Data

US 2015/0354672 A1 Dec. 10, 2015

Related U.S. Application Data

(63) Continuation-in-part of application No. 14/301,263, filed on Jun. 10, 2014, now Pat. No. 9,255,626.

(51) Int. Cl.
*F16H 3/66* (2006.01)
*F16H 37/08* (2006.01)
(Continued)

(52) U.S. Cl.
CPC .............. *F16H 3/663* (2013.01); *B64C 27/12* (2013.01); *B64D 35/00* (2013.01); *F16H 1/28* (2013.01);
(Continued)

(58) Field of Classification Search
CPC ...... F16H 1/28; F16H 1/46; F16H 2001/2872; F16H 37/08; F16H 37/0806; F16H 37/0813; B64D 35/06; B64C 27/08; B64C 27/10
See application file for complete search history.

(56) References Cited

U.S. PATENT DOCUMENTS 2,053,130 A    9/1936   Cheyne
2,700,311 A *   1/1955   Bade ..................... B64D 35/04
                                                                   475/330
(Continued)

FOREIGN PATENT DOCUMENTS

DE            4234873       4/1994
DE            19845182      4/2000
(Continued)

OTHER PUBLICATIONS

Office action for related U.S. Appl. No. 14/301,263, United States Patent and Trademark Office, Oct. 8, 2015.
(Continued)

*Primary Examiner* — David Morris
(74) *Attorney, Agent, or Firm* — DASCENZO Intellectual Property Law, P.C.

(57) ABSTRACT

Planetary gear systems, transmissions, and apparatuses include a plurality of compound planet gears, each having three gear stages, a first non-fixed annular gear, a second non-fixed annular gear, a fixed annular gear, and a non-fixed sun gear. A rotational input to the non-fixed sun gear results in opposite rotational outputs of the first non-fixed annular gear and the second non-fixed annular gear. Compound planet gears and carriers for planetary gear systems are also disclosed.

23 Claims, 14 Drawing Sheets

(51) Int. Cl.
*F16H 1/46* (2006.01)
*F16H 57/08* (2006.01)
*B64D 35/00* (2006.01)
*F16H 1/28* (2006.01)
*B64C 27/12* (2006.01)

(52) U.S. Cl.
CPC ............ *F16H 57/082* (2013.01); *F16H 1/46* (2013.01); *F16H 37/0806* (2013.01); *F16H 37/0813* (2013.01); *F16H 2001/2872* (2013.01); *F16H 2200/2028* (2013.01)

(56) References Cited

U.S. PATENT DOCUMENTS

| | | | |
|---|---|---|---|
| 3,234,821 A | 2/1966 | Himmel et al. | |
| 3,258,995 A | 7/1966 | Bennett et al. | |
| 3,640,150 A | 2/1972 | Leiner et al. | |
| 3,939,736 A * | 2/1976 | Morin | F16H 57/082 475/331 |
| 4,751,855 A | 6/1988 | Hudson et al. | |
| 4,825,723 A * | 5/1989 | Martin | B64C 13/34 475/330 |
| 4,882,943 A | 11/1989 | Pipon et al. | |
| 5,120,285 A | 6/1992 | Grimm | |
| 5,133,698 A | 7/1992 | Hermans et al. | |
| 5,385,514 A | 1/1995 | Dawe | |
| 5,518,466 A | 5/1996 | Tiedeman | |
| 5,910,066 A | 6/1999 | Schulz et al. | |
| 6,123,640 A | 9/2000 | Schulz | |
| 6,554,734 B1 | 4/2003 | Maydew | |
| 6,875,145 B2 | 4/2005 | McKay et al. | |
| 7,121,973 B2 | 10/2006 | Lumpkin et al. | |
| 7,507,180 B2 | 3/2009 | Robuck | |
| 8,015,900 B2 * | 9/2011 | Gmirya | B64C 27/12 74/409 |
| 8,814,505 B2 * | 8/2014 | Bellis | B64C 11/306 415/124.1 |
| 2003/0162630 A1 * | 8/2003 | Poulin | F02C 7/36 475/331 |
| 2005/0130792 A1 | 6/2005 | Drago et al. | |
| 2007/0042854 A1 * | 2/2007 | Edelson | F16H 3/56 475/149 |
| 2011/0021307 A1 | 1/2011 | Davies | |
| 2014/0049784 A1 | 2/2014 | Woloschyn | |

FOREIGN PATENT DOCUMENTS

| | | |
|---|---|---|
| EP | 2 146 112 | 1/2010 |
| EP | 2551550 | 1/2013 |
| EP | 2 554 873 | 2/2013 |
| EP | 2647881 | 10/2013 |
| EP | 2 955 412 | 12/2015 |
| JP | 2006349046 | 12/2006 |
| WO | WO2011/100499 | 8/2011 |

OTHER PUBLICATIONS

English machine-translation of abstract of DE 4234873, downloaded from espacenet.com on Nov. 4, 2015.
English machine-translation of abstract of DE 19845182, downloaded from espacenet.com on Nov. 4, 2015.
Extended European Search Report for related foreign patent application EP 15165606, European Patent Office, Oct. 20, 2015.
"Compound Planetary Rotary Actuator," webpage downloaded from www.zakgear.com/Power_Hinge.html on Apr. 7, 2014.
European Patent Office, Partial European Search Report for related European Application No. 16170947, issued Feb. 10, 2017.
Machine-generated English translation of the abstract of EP 2 146 112, downloaded from Espacenet.com on Apr. 5, 2017.
European Patent Office, Extended European Search Report for related European Application No. 16170947, issued Feb. 10, 2017.
Machine-generated English translation of the abstract of JP 2006349046.

* cited by examiner

AIRCRAFT AND PLANETARY GEAR SYSTEMS

RELATED APPLICATION

This application is a continuation-in-part of and claims priority under 35 USC 120 to U.S. patent application Ser. No. 14/301,263, entitled "ROTORCRAFT AND PLANETARY GEAR SYSTEMS," filed on Jun. 10, 2014, the complete disclosure of which is hereby incorporated by reference.

FIELD

The present disclosure relates to aircraft and planetary gear systems.

BACKGROUND

With reference to the schematic illustrations of FIGS. 1-2, prior art planetary gear trains 10 include a series of planet gears 12, a sun gear 14, an annular, or ring, gear 16, and a carrier 18. The sun gear and the annular gear are coaxially aligned, with the planet gears being spaced around and meshed between the sun gear and the annular gear. The carrier interconnects the rotational axes of the planet gears. One of the sun gear, the annular gear, and the carrier is grounded, or fixed, with the others of the sun gear, the annular gear, and the carrier being freely rotatable, or unfixed. Accordingly, with reference to FIG. 1, when the sun gear is fixed, a rotational input of the annular gear results in a rotational output of the carrier, and vice versa. With reference to FIG. 2, when the annular gear is fixed, a rotational input of the sun gear results in a rotational output of the carrier, and vice versa. In both configurations and as schematically indicated in FIGS. 1-2, the rotational direction of the input is the same as the rotational direction of the output. However, although not illustrated, when the carrier is fixed, a rotational input of one of the sun gear and the annular gear results in an opposite rotational output of the other of the sun gear and the annular gear.

Planetary gear trains are used in a variety of applications to transmit a rotational input having a frequency of rotation (e.g., rotations per minute, or RPM) and torque to a rotational output having a different frequency of rotation and/or torque. When compared to other configurations of transmissions, planetary gear trains typically provide the advantages of a coaxial input and output, a compact and radially symmetrical design, and a high efficiency of energy transfer (i.e., low frictional losses); however, significant forces are required to be transferred between the planet gears and the carrier, resulting in heavy bearing assemblies being required. Moreover, regular inspection and lubrication of the bearing assemblies are required.

In applications associated with rotorcraft, such as the transmission of a high RPM and low torque engine input to a low RPM and high torque rotor output with a reduction ratio on the order of 60:1, the weight and maintenance of the transmission components can be significant. Existing rotorcraft transmissions rely on a high final drive ratio to reduce or eliminate intermediate reduction stages, which minimizes overall transmission system weight. However, prior art transmissions that utilize planetary gear trains rely on large diameter planet gears to achieve the desired high final drive ratio, and because force is transferred to the carrier by the center of the planet gears via bearing assemblies, the mechanical advantage of the transmission is limited by the diameter of the planet gears. As such, for a given ring gear diameter, larger planet gears are needed to achieve higher reduction ratios. Larger planet gears limit the number of planet gears that can be used, which reduces load sharing and increases system weight and system envelope. Accordingly, there is a need for lighter weight, lower maintenance, larger reduction ratios, and smaller envelopes associated with planetary gear trains, such as in applications associated with rotorcraft.

SUMMARY

Planetary gear systems, transmissions, and apparatuses, such as aircraft, as well as compound gears and carriers for use in planetary gear systems, are disclosed herein. A planetary gear system according to the present disclosure includes at least one non-fixed annular gear, at least one non-fixed sun gear, at least one compound planet gear meshed between the at least one non-fixed annular gear and the at least one non-fixed sun gear, and at least one fixed gear meshed with the at least one compound planet gear. Rotational input to one of the at least one non-fixed annular gear and the at least one non-fixed sun gear results in rotational output of the other of the at least one non-fixed annular gear and the at least one non-fixed sun gear. Some planetary gear systems according to the present disclosure also may be configured so that a rotational input of a non-fixed gear results in rotational outputs of two or more, separate non-fixed gears.

Transmissions according to the present disclosure include a planetary gear system, an input shaft that is operatively coupled to one of the non-fixed annular gear and the non-fixed sun gear, an output shaft that is operatively coupled to the other of the non-fixed annular gear and the non-fixed sun gear, and a housing operatively coupled to the fixed gear. Accordingly, rotation of the input shaft results in rotation of the output shaft. Some transmissions according to the present disclosure may include two output shafts that are configured to rotate in response to rotation of the input shaft.

Aircraft according to the present disclosure include a fuselage, a transmission having a planetary gear system according to the present disclosure, an engine operatively supported by the fuselage and operatively coupled to the input shaft of the transmission, and a rotor or propeller operatively coupled to the output shaft of the transmission.

DESCRIPTION

Figure 1:
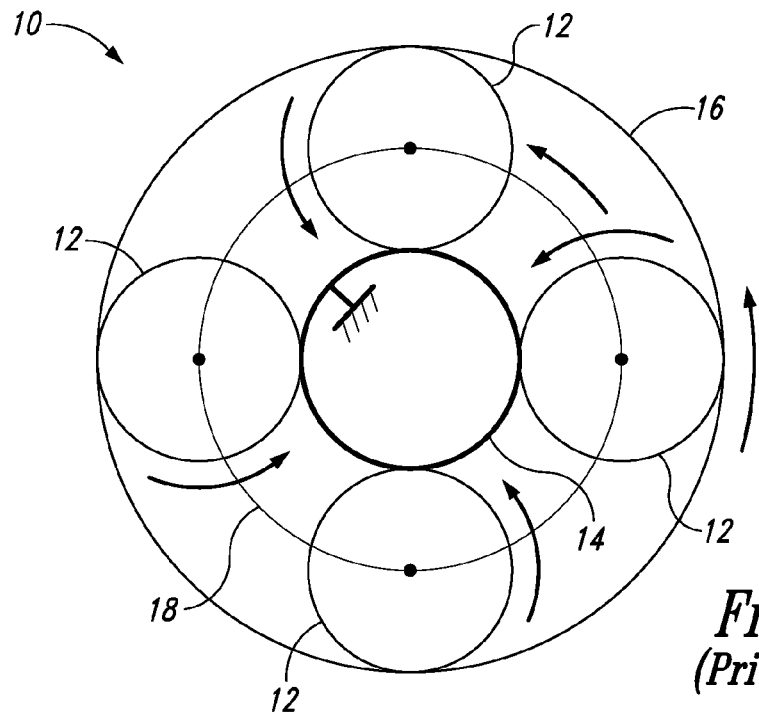
FIG. 1 is a schematic representation of prior art planetary gear trains.
Figure 2:
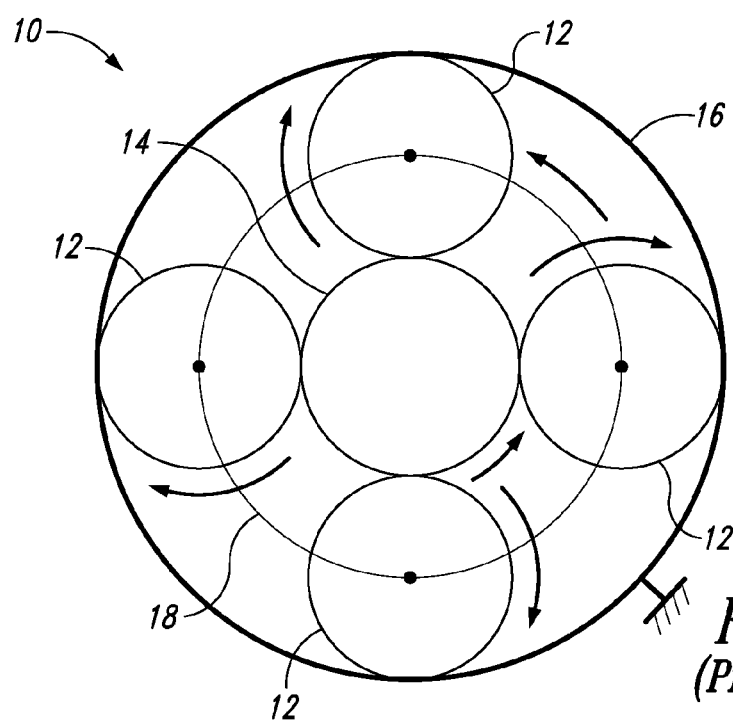
FIG. 2 is another schematic representation of prior art planetary gear trains.

Planetary gear systems and transmissions and apparatuses that include planetary gear systems are disclosed herein. Various planetary gear systems according to the present disclosure are schematically presented in FIGS. 3-6 and are indicated generally at 100. Planetary gear systems 100 additionally or alternatively may be described as or referred to as planetary gear trains 100 or as epicyclic gear systems 100 or gear trains 100. Planetary gear systems 100 include at least one non-fixed annular gear 102, at least one non-fixed sun gear 104, at least one compound planet gear 106 meshed between the at least one non-fixed annular gear and the at least one non-fixed sun gear, and at least one fixed gear 108 meshed with the at least one compound planet gear.

Some planetary gear systems 100 according to the present disclosure include a carrier that interconnects multiple planet gears. However, some planetary gear systems 100 according to the present disclosure may not include, and/or may not require inclusion of, a carrier that interconnects multiple planet gears. Accordingly, some planetary gear system 100 may be described as being free of a carrier and/or as the planet gears not being directly tied together. As a result, in such examples that do not include carriers, no bearings, such as roller bearings, are required to transfer force from the planet gears to and/or from a carrier used as a rotational input or rotational output. Therefore, such non-exclusive examples of planetary gear systems 100 may have a reduced weight and less required maintenance when compared to prior art planetary gear trains that do include carriers. However, as discussed herein, it is within the scope of the present disclosure that some planetary gear systems 100 may include a carrier that interconnects a plurality of planet gears. Moreover, when included within a planetary gear system 100, a carrier may not be used as a rotational input or rotational output, and instead may be provided solely to constrain and align the planet gears. Because the optional carrier is not being used as a rotational input and/or a rotational output, the carrier geometry and associated bearings are not required to carry and/or transfer the significant forces associated with prior art planetary gear trains. Throughout the figures, the various gears of planetary gear systems 100 may be illustrated without teeth to facilitate illustration; however, it is understood that such illustrated gears include corresponding teeth of any suitable configuration. Moreover, while FIGS. 3-6 do not schematically illustrate a carrier interconnecting the planet gears, an optional carrier may be included in optional embodiments, as discussed above.

In planetary gear systems 100, a rotational input to one of the non-fixed annular gear 102 or the non-fixed sun gear 104 results in a rotational output of the other of the non-fixed annular gear and the non-fixed sun gear. As discussed further herein, some planetary gear systems 100 include more than one non-fixed sun gear 104, and some planetary gear systems 100 include more than one non-fixed annular gear 102. Moreover, while each of the schematic representations of the planetary gear systems 100 of FIGS. 3-6 include four planet gears 106, any number of suitable planet gears may be included within a planetary gear system 100, including one or more planet gears, for example, depending on a particular application of the planetary gear system.

A sun gear of a planetary gear system 100 has radially outward directed teeth. A sun gear additionally or alternatively may be referred to as or described as a pinion gear and/or an external gear. An annular gear of a planetary gear system 100 has radially inward directed teeth. An annular gear additionally or alternatively may be referred to as or described as a ring gear and/or as an internal gear. Moreover, an annular gear shares a central axis with the sun gear(s) of a planetary gear system 100. A planet gear of a planetary gear system 100 is a pinion gear that is meshed between at least one annular gear and at least one sun gear.

Gears of a planetary gear system may be fixed or non-fixed. A fixed gear is a gear that is fixed, or grounded, relative to a non-fixed gear and does not rotate with respect to a frame, housing, or other structure by which the planetary gear system is supported, and a non-fixed gear is configured to rotate about its central axis relative to a frame, housing, or other structure by which the planetary gear system is supported. Accordingly, sun gears and annular gears of a planetary gear system 100 share a central axis. A non-fixed sun gear 104 and a non-fixed annular gear 102 are configured to rotate about a primary rotation axis 110. A fixed gear 108 has a central axis that is coaxial with the primary rotation axis. Fixed gears are schematically represented in the figures with a grounded symbol.

Planet gears of planetary gear systems 100 each include an axis of rotation 112 that is spaced away from the primary rotation axis 110, but the one or more planet gears of a planetary gear system orbit, or travel, around the primary axis rotation 110. Accordingly, planet gears may be described as non-fixed gears.

Compound planet gears 106 include at least two external gears, or sets of gear teeth, that are fixed relative to a common shaft and that share the same axis of rotation 112, but with the individual external gears of the compound planet gear typically having different pitch diameters. However, it also is within the scope of compound planet gears to have two or more spaced apart external gear sections having the same pitch diameter. A set of gear teeth or an individual external gear section of a compound planet gear may be referred to as a stage or gear stage of the compound planet gear. Additionally or alternatively, two spaced-apart gear sections having the same pitch diameter also may be described as forming a single gear stage of a compound planet gear. Individual gear stages and/or the combination of two or more gear stages of a compound planet gear, together with the corresponding gear or gears with which the gear stages are meshed, may define a double helical mesh configuration or other geometry with axial engagement to maintain the mesh, and axial constraint, of the compound planet gears with the corresponding gear or gears.

Figure 3:
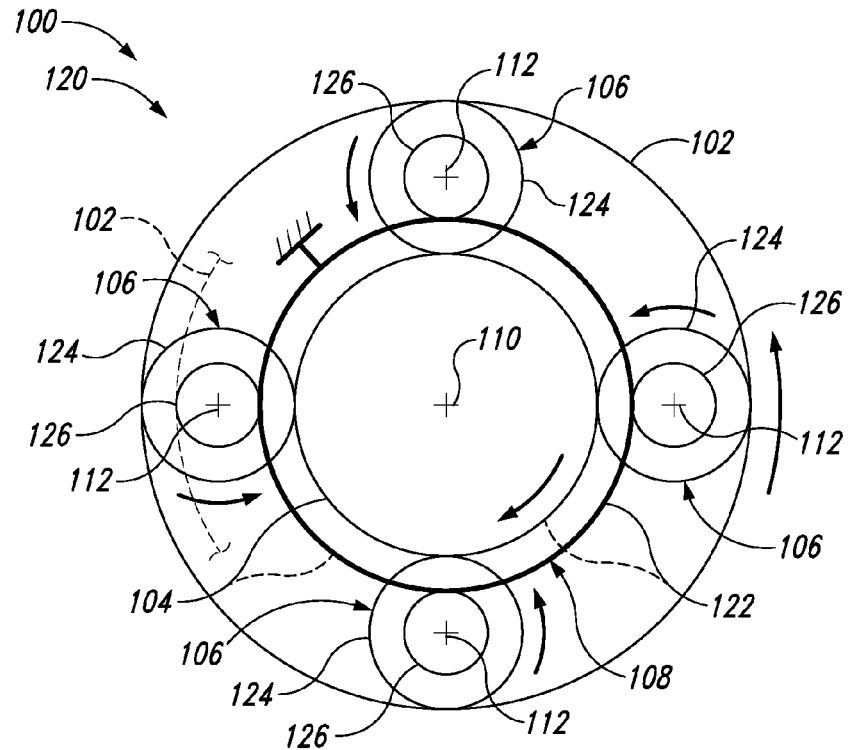
FIG. 3 is a schematic representation of planetary gear systems according to the present disclosure.

With reference first to FIG. 3, examples of planetary gear systems 100 are schematically represented and generally indicated at 120. Planetary gear systems 120 include a non-fixed annular gear 102, a non-fixed sun gear 104, at least one compound planet gear 106, and a fixed gear 108 in the form of a fixed sun gear 122. Each compound planet gear 106 is operatively positioned between and meshed with (i) the non-fixed annular gear and (ii) the non-fixed sun gear and the fixed sun gear. Each compound planet gear includes a larger planet gear stage 124 and a smaller planet gear stage 126. The larger planet gear stage may be described as having a larger pitch diameter, and the smaller planet gear stage may be described as having a smaller pitch diameter that is less than the larger pitch diameter. In some planetary gear systems 120, the larger planet gear stage is meshed between the non-fixed sun gear 104 and the non-fixed annular gear 102, while the smaller planet gear stage is meshed only with the fixed sun gear 122. However, as schematically and optionally illustrated in dashed lines in FIG. 3, it also is within the scope of planetary gear systems 120 that the smaller planet gear stage 126 is meshed between the non-fixed annular gear 102 and the fixed sun gear 122, while the larger planet gear stage 124 is meshed only with the non-fixed sun gear 104. Additionally or alternatively, as indicated with dashed lead lines for 104 and 122 in FIG. 3, it also is within the scope of planetary gear systems 120 that the non-fixed sun gear 104 is meshed with the smaller planet gear stage 126 and that the fixed sun gear 122 is meshed with the larger planet gear stage 124. In such a configuration, the non-fixed sun gear therefore would have a larger pitch diameter than the fixed sun gear. Depending on the relative sizes of the pitch diameters of the stages of the compound planet gears and their respective meshing with the sun gears and the annular gear, rotation of the non-fixed annular gear 102 may result in an opposite rotation of the non-fixed sun gear 104, and vice versa, as schematically represented by the arrows in FIG. 3. However, some configurations of planetary gear systems 120, depending on the relative sizing and respective meshing of the compound planet gear stages, may result in an output that is in the same rotational direction as the input. For example, the direction of rotation of the non-fixed sun gear 104 would be the same as the direction of rotation of the non-fixed annular gear 102 if the smaller of the two sun gears were fixed and the larger of the two sun gears were not fixed, opposite of how illustrated in FIG. 3.

Figure 4:
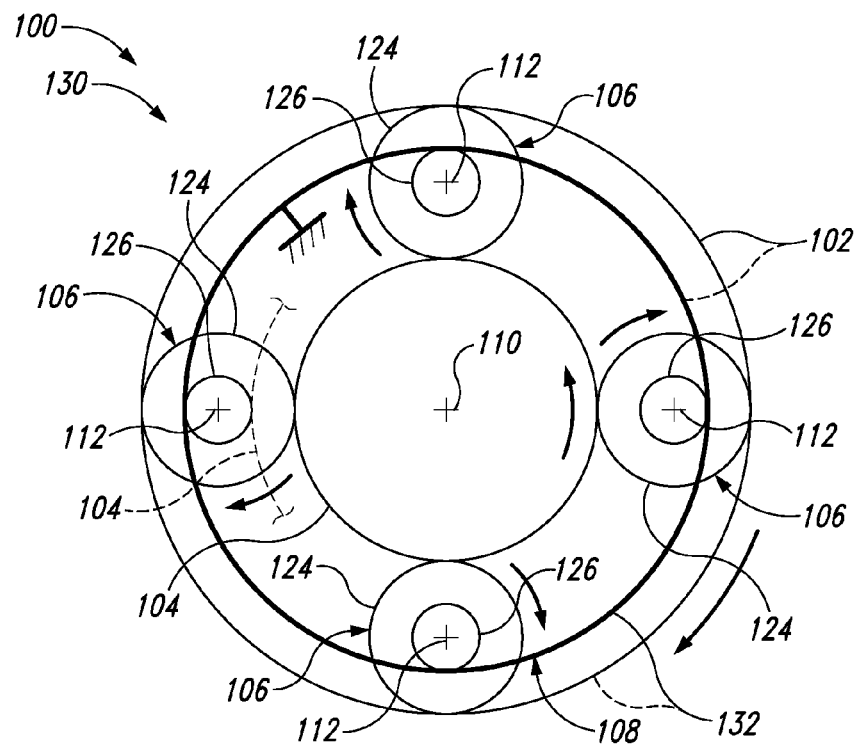
FIG. 4 is a schematic representation of planetary gear systems according to the present disclosure.

Turning now to FIG. 4, additional examples of planetary gear systems 100 are schematically represented and generally indicated at 130. Similar to planetary gear systems 120, planetary gear systems 130 include a non-fixed annular gear 102, a non-fixed sun gear 104, and at least one compound planet gear 106. However, unlike planetary gear systems 120, planetary gear systems 130 include a fixed gear 108 in the form of a fixed annular gear 132. Each compound planet gear 106 is operatively positioned between and meshed with (i) the non-fixed sun gear 104 and (ii) the non-fixed annular gear 102 and the fixed annular gear 132. Each compound planet gear includes a larger planet gear stage 124 and a smaller planet gear stage 126. In some planetary gear systems 130, the larger planet gear stage 124 is meshed between the non-fixed annular gear 102 and the non-fixed sun gear 104, while the smaller planet gear stage is meshed only with the fixed annular gear 132. However, as schematically and optionally illustrated in dashed lines in FIG. 4, it also is within the scope of planetary gear systems 130 that the smaller planet gear stage 126 is meshed between the fixed annular gear 132 and the non-fixed sun gear 104, while the larger planet gear stage 124 is meshed only with the non-fixed annular gear 102. Additionally or alternatively, as indicated with dashed lead lines for 102 and 132 in FIG. 4, it also is within the scope of planetary gear systems 130 that the non-fixed annular gear 102 is meshed with the smaller planet gear stage 126 and that the fixed annular gear 132 is meshed with the larger planet gear stage 124. In such a configuration, the non-fixed annular gear would therefore have a smaller pitch diameter than the fixed annular gear. Depending on the relative sizes of the pitch diameters of the stages of the compound planet gears and their respective meshing with the annular gears and the sun gear, rotation of the non-fixed annular gear 102 may result in an opposite rotation of the non-fixed sun gear 104, and vice versa, as schematically represented by the arrows in FIG. 4. However, some configurations of planetary gear systems 130, depending on the relative sizing and respective meshing of the compound planet gear stages, may result in an output that is in the same rotational direction as the input. For example, the direction of rotation of the non-fixed annular gear 102 would be the same as the direction of rotation of the non-fixed sun gear 104 if the larger of the two annular gears were fixed and the smaller of the two annular gears were not fixed, opposite of how illustrated in FIG. 4.

With both planetary gear systems 120 and planetary gear systems 130, a rotational input of a non-fixed gear results in a rotational output of a single, separate non-fixed gear. However, planetary gear systems 100 also may be configured so that a rotational input of a non-fixed gear results in rotational outputs of two, separate non-fixed gears.

Figure 5:
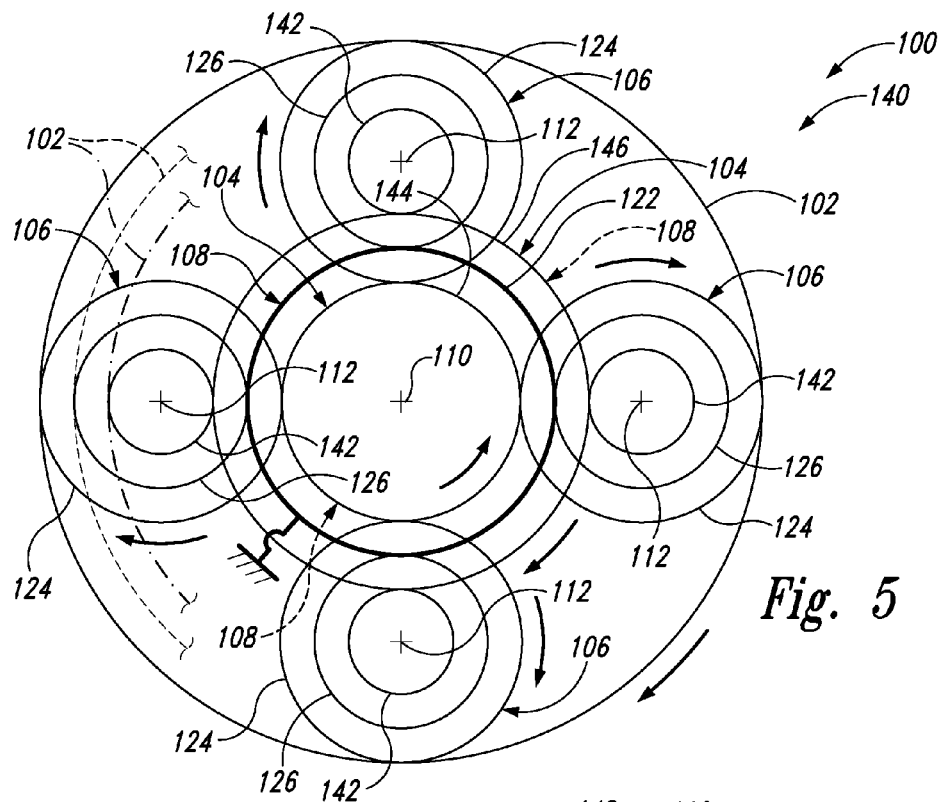
FIG. 5 is a schematic representation of planetary gear systems according to the present disclosure.

For example, with reference to FIG. 5, examples of such planetary gear systems 100 are schematically represented and generally indicated at 140. Planetary gear systems 140 include a non-fixed annular gear 102, two non-fixed sun gears 104, at least one compound planet gear 106, and a fixed gear 108 in the form of a fixed sun gear 122. Each compound planet gear 106 includes a larger planet gear stage 124, a smaller planet gear stage 126, and a smallest planet gear stage 142 having a smallest pitch diameter that is smaller than the smaller pitch diameter of the smaller planet gear stage. In FIG. 5, the two non-fixed sun gears 104 are denoted as a first non-fixed sun gear 144 and a second non-fixed sun gear 146, with the first non-fixed sun gear having a pitch diameter that is smaller than a pitch diameter of the fixed sun gear 122, and with the pitch diameter of the fixed sun gear being smaller than a pitch diameter of the second non-fixed sun gear. In some planetary gear systems 140, the larger planet gear stage 124 is meshed between the non-fixed annular gear 102 and the first non-fixed sun gear 144, while the smaller planet gear stage 126 is meshed only with the fixed sun gear 122, and while the smallest planet gear stage 142 is meshed only with the second non-fixed sun gear 146. However, as schematically and optionally illustrated in dashed lines and dash dot lines in FIG. 5, it also is within the scope of planetary gear systems 140 that rather than the larger planet gear stage 124 being meshed with the non-fixed annular gear 102, the smaller planet gear stage 126 or the smallest planet gear stage 142, respectively, is instead meshed with the non-fixed annular gear. Additionally or alternatively, while the illustrated example includes a fixed sun gear with a pitch diameter between the pitch diameters of the two non-fixed sun gears, it also is within the scope of planetary gear systems 140 for the fixed sun gear to have a pitch diameter that is larger than both of the two non-fixed sun gears or to have a pitch diameter that is smaller than both of the two non-fixed sun gears, with the resulting sun gears meshed with corresponding gear stages of the compound planet gears. Depending on the relative sizes of the pitch diameters of the stages of the compound planet gears and their respective meshing with the sun gears and the annular gear, rotation of the non-fixed annular gear may result in rotation of the second non-fixed sun gear 146 in the same rotational direction as the non-fixed annular gear, and rotation of the first non-fixed sun gear 144 in an opposite rotational direction, as schematically represented by the arrows in FIG. 5.

Moreover, some planetary gear systems 140 may be configured so that the first non-fixed sun gear 144 and the second non-fixed sun gear 146 rotate in opposite rotational directions at the same (or substantially the same) frequency of rotation (e.g., RPM) in response to a rotational input to the non-fixed annular gear 102. For example, opposite rotational directions of the non-fixed sun gears 144, 146 at the same frequency of rotation in a planetary gear system 140 result when the pitch diameter or the number of gear teeth (or tooth counts) for the component gears meets the following equation:

(Equation 1-Equal and Opposite Outputs for Systems 140)

$$\frac{N_{122}}{N_{126}} \times \left(\frac{N_{124}}{N_{144}} + \frac{N_{142}}{N_{146}}\right) = 2,$$

where $N_{122}$ is the pitch diameter or the tooth count of the fixed sun gear 122, $N_{126}$ is the pitch diameter or the tooth count of the smaller planet gear stage 126, $N_{124}$ is the pitch diameter or the tooth count of the larger planet gear stage 124, $N_{146}$ is the pitch diameter or the tooth count of the second non-fixed sun gear 146, $N_{142}$ is the pitch diameter or the tooth count of the smallest planet gear stage 142, and $N_{144}$ is the pitch diameter or the tooth count of the first non-fixed sun gear 144.

However, some configurations of planetary gear systems 140, depending on the relative sizing, tooth counts, and respective meshing of the compound planet gear stages with the sun gears and the annular gear, may result in outputs with different rotational directions and/or frequencies of rotation, and the above examples are non-exclusive.

Figure 6:
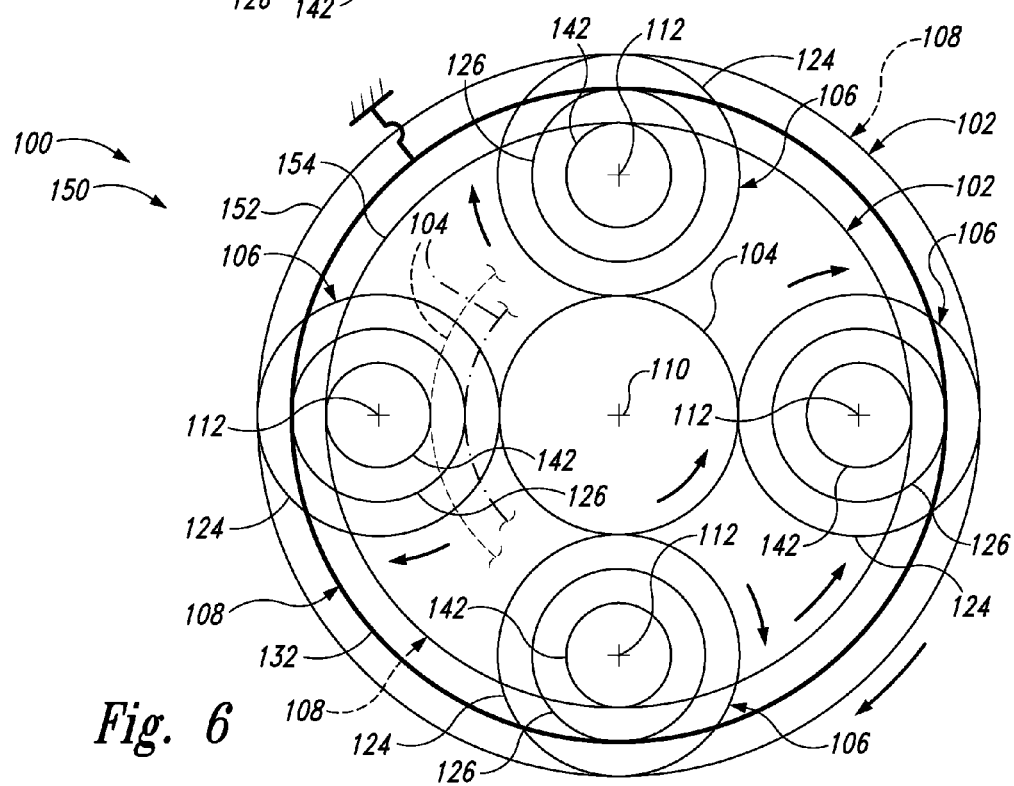
FIG. 6 is a schematic representation of planetary gear systems according to the present disclosure.

Turning now to FIG. 6, additional examples of planetary gear systems 100 with two rotational outputs resulting from a single rotational input are schematically represented and generally indicated at 150. Planetary gear systems 150 include two non-fixed annular gears 102, a single non-fixed sun gear 104, at least one compound planet gear 106, and a fixed gear 108 in the form of a fixed annular gear 132. Each compound planet gear 106 includes a larger planet gear stage 124, a smaller planet gear stage 126, and a smallest planet gear stage 142. In FIG. 6, the two non-fixed annular gears 102 are denoted as a first non-fixed annular gear 152 and a second non-fixed annular gear 154, with the first non-fixed annular gear 152 having a pitch diameter that is larger than a pitch diameter of the fixed annular gear 132, and with the pitch diameter of the fixed annular gear 132 being larger than a pitch diameter of the second non-fixed annular gear 154. In some planetary gear systems 150, the larger planet gear stage 124 is meshed between the first non-fixed annular gear 152 and the non-fixed sun gear 104, while the smaller planet gear stage 126 is meshed only with the fixed annular gear 132, and while the smallest planet gear stage 142 is meshed only with the second non-fixed annular gear 154. However, as schematically and optionally illustrated in dashed lines and dash dot lines in FIG. 6, it also is within the scope of planetary gear systems 150 that rather than the larger planet gear stage 124 being meshed with the non-fixed sun gear 104, the smaller planet gear stage 126 or the smallest planet gear stage 142, respectively, is instead meshed with the non-fixed sun gear. Additionally or alternatively, while the illustrated example includes a fixed annular gear with a pitch diameter between the pitch diameters of the two non-fixed annular gears, it also is within the scope of planetary gear systems 150 for the fixed annular gear to have a pitch diameter that is larger than both of the two non-fixed annular gears or to have a pitch diameter than is smaller than both of the two non-fixed annular gears, with the resulting annular gears meshed with corresponding gear stages of the compound planet gears. Depending on the relative sizes of the pitch diameters of the stages of the compound planet gears and their respective meshing with the annular gears and the sun gear, rotation of the non-fixed sun gear may result in rotation of the second non-fixed annular gear 154 in the same rotational direction as the non-fixed sun gear and rotation of the first non-fixed annular gear 152 in an opposite rotational direction, as schematically represented by the arrows in FIG. 6.

Moreover, some planetary gear systems 150 may be configured so that the first non-fixed annular gear 152 and the second non-fixed annular gear 154 rotate in opposite rotational directions at the same (or substantially the same) frequency of rotation (e.g., RPM) and/or with the same (or substantially the same) absolute value of torque in response to a rotational input to the non-fixed sun gear 104. For example, opposite rotational directions of the non-fixed annular gears 152, 154 at the same frequency of rotation in a planetary gear system 150 result when the pitch diameter or number of gear teeth (or tooth count) for each gear meets the following equation:

(Equation 2-Equal and Opposite Outputs for Systems 150)

$$\frac{N_{132}}{N_{126}} \times \left(\frac{N_{124}}{N_{152}} + \frac{N_{142}}{N_{154}}\right) = 2,$$

where $N_{132}$ is the pitch diameter or the tooth count of the fixed annular gear 132, $N_{126}$ is the pitch diameter or the tooth count of the smaller planet gear stage 126, $N_{124}$ is the pitch diameter or the tooth count of the larger planet gear stage 124, $N_{152}$ is the pitch diameter or the tooth count of the first non-fixed annular gear 152, $N_{142}$ is the pitch diameter or the tooth count of the smallest planet gear stage 142, and $N_{154}$ is the pitch diameter or the tooth count of the second non-fixed annular gear 154.

As an illustrative, non-exclusive example, a planetary gear system 150 having the following ratios of tooth counts or pitch diameters results in the non-fixed annular gears 152, 154 having opposite rotational directions at the same (or substantially the same) frequency of rotation responsive to a rotational input by the non-fixed sun gear 104 when the non-fixed sun gear 104 is meshed with the smaller planet gear 126, as schematically represented in FIG. 6 by the dash-dot representation of the non-fixed sun gear 104:

$T_{132}:T_{126}:T_{104}=156:24:108$ (Equation 3), $T_{152}:T_{124}=182:34$ (Equation 4), $T_{154}:T_{142}=182:22$ (Equation 5), where $T_{132}$ is the tooth count or the pitch diameter of the fixed annular gear 132, $T_{126}$ is the tooth count or the pitch diameter of the smaller planet gear stage 126, $T_{104}$ is the tooth count or the pitch diameter of the non-fixed sun gear 104, $T_{152}$ is the tooth count or the pitch diameter of the first non-fixed annular gear 152, $T_{124}$ is the tooth count or the pitch diameter of the larger planet gear stage 124, $T_{154}$ is the tooth count or the pitch diameter of the second non-fixed annular gear 154, and $T_{142}$ is the tooth count or the pitch diameter of the smallest planet gear stage 142. Planetary gear systems 150 also may have tooth counts or pitch diameters having similar ratios, such as in the following ranges:

$T_{132}:T_{126}:T_{104}=(110\text{-}200):(18\text{-}30):(80\text{-}150)$ (Equation 6), $T_{152}:T_{124}=(110\text{-}200):(18\text{-}40)$ (Equation 7), $T_{154}:T_{142}=(110\text{-}200):(20\text{-}26)$ (Equation 8).

Planetary gear systems 150 also may be described in terms of the diametral pitches (tooth count divided by pitch diameter in inches (in.)) of the gear stages of the compound planet gears 106. As illustrative, non-exclusive examples, a compound planet gear 106 of a planetary gear system 150 may have a diametral pitch of 5.65 for the smaller planet gear stage 126 (and thus also for the fixed annular gear 132 and the larger non-fixed sun gear 104), a diametral pitch of 6.3348 for the larger planet gear stage 124 (and thus also for the first non-fixed annular gear 152), and a diametral pitch of 6.8485 for the smallest planet gear stage 142 (and thus also the second non-fixed annular gear 154). However, different applications may benefit from different diametral pitches. As an example only, it may be beneficial for rotorcraft applications to design compound planet gears 106 of planetary gear systems 150 so that each stage has a diametral pitch in the range of approximately 4-10; however, diametral pitches outside of this range are within the scope of the present disclosure and may be incorporated into planetary gear systems 150.

Turning now to FIGS. 7-10, illustrative non-exclusive examples of planetary gear systems 100 are illustrated and designated as planetary gear system 200, planetary gear system 300, planetary gear system 350, and planetary gear system 800, respectively. Where appropriate, the reference numerals from the schematic illustrations of FIGS. 3-6 are used to designate corresponding parts of planetary gear systems 200, 300, 350, and 800; however, the examples of FIGS. 7-10 are non-exclusive and do not limit planetary gear systems 100 to the illustrated embodiments of planetary gear systems 200, 300, 350, and 800. That is, planetary gear systems 100 are not limited to the specific embodiments of FIGS. 7-10, and planetary gear systems 100 may incorporate any number of the various aspects, configurations, characteristics, properties, etc. of planetary gear systems that are illustrated in and discussed with reference to the schematic representations of FIGS. 3-6 and/or the embodiments of FIGS. 7-10, as well as variations thereof, without requiring the inclusion of all such aspects, configurations, characteristics, properties, etc.

Figure 7:
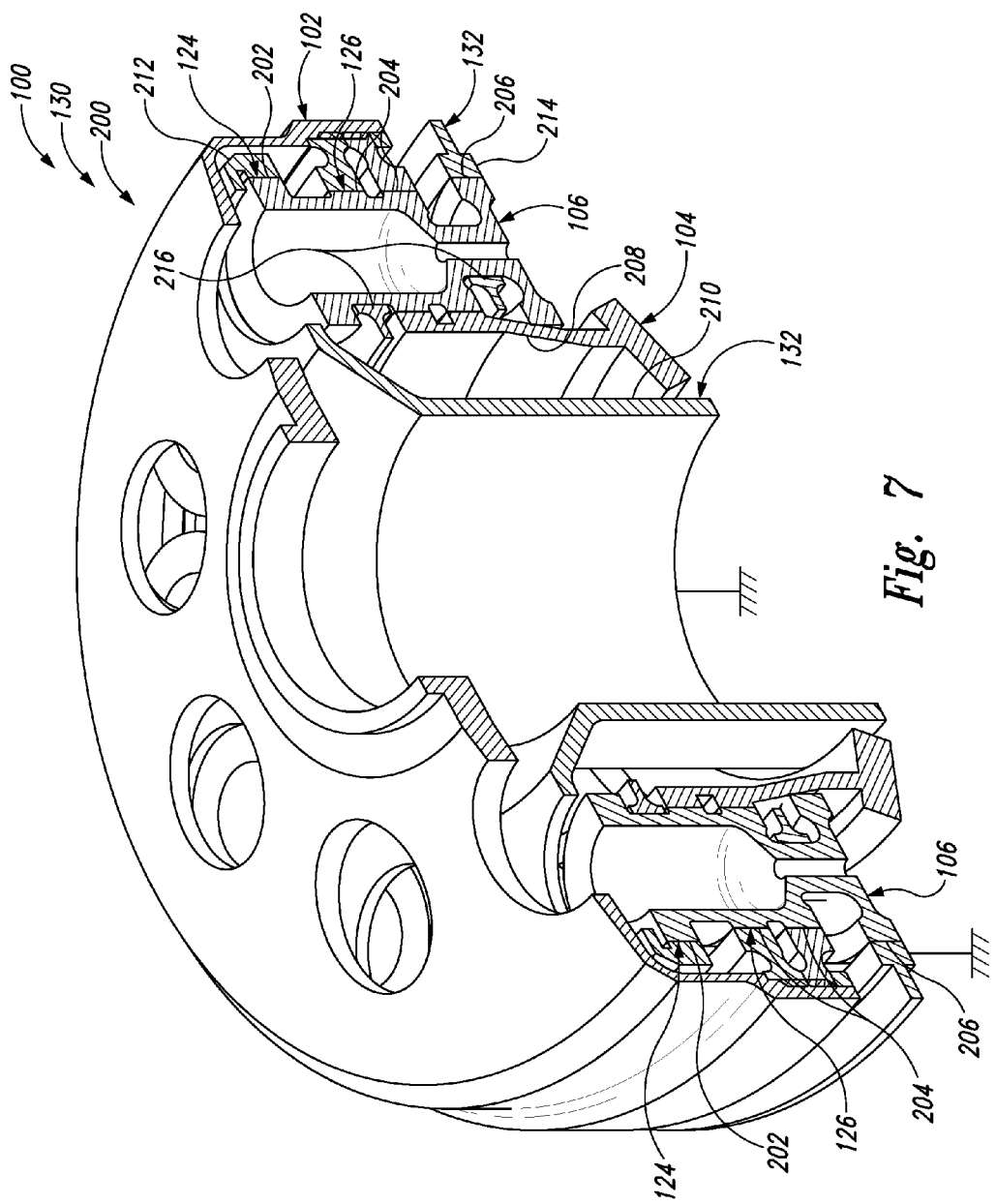
FIG. 7 is an isometric cross-sectional view of an example of a planetary gear system according to the present disclosure.

With reference first to the illustrative, non-exclusive example of FIG. 7, planetary gear system 200 is an example of a planetary gear system 130, such as schematically illustrated in FIG. 4 and discussed herein. The compound planet gears 106 of planetary gear system 200 each include an upper gear stage 202, a middle gear stage 204, and a lower gear stage 206. The upper gear stage and lower gear stage of each compound planet gear have the same pitch diameter and are meshed with the fixed annular gear 132, which includes an upper portion 212 and a lower portion 214 in the illustrated example. The upper and lower portions of the fixed annular gear 132 have the same pitch diameters and are positioned above and below the middle gear stage 204 to balance gear mesh forces acting on the compound planet gears 106. The middle gear stage is meshed between the non-fixed annular gear 102 and the non-fixed sun gear 104. Moreover, the upper gear stage and the lower gear stage of each compound planet gear collectively define the larger planet gear stage 124, and the middle gear stage defines the smaller planet gear stage 126. Accordingly, in the illustrated example, the fixed annular gear has a larger pitch diameter than the non-fixed annular gear. However, a variation on planetary gear system 200 may include the opposite, with the upper gear stage and the lower gear stage collectively defining the smaller planet gear stage, and with the middle gear stage defining the larger planet gear stage.

The non-fixed sun gear 104 of planetary gear system 200 defines a central bore 208, and the fixed annular gear 132 extends from the upper gear stages 202 of the compound planet gears over the compound planet gears to then define a shaft 210 that extends through the central bore of the non-fixed sun gear. Accordingly, planetary gear system 200 may be mounted or otherwise fixed to a housing or other grounding, or fixed, structure via the shaft 210 of the fixed annular gear 132.

Additionally, the fixed annular gear 132 of planetary gear system 200 includes a first, upper portion 212 and a second, lower portion 214, with the upper portion being meshed with the upper gear stages 202 of the compound planet gears and the lower portion being meshed with the lower gear stages 206 of the compound planet gears. Moreover, the upper portion 212 is integral with, or otherwise operatively connected to the shaft 210. While the upper portion and the lower portion collectively define the fixed annular gear, the upper portion and the lower portion may be spaced apart from each other as distinct structures without physical engagement. Such a configuration may balance the forces acting on the compound planet gears.

Planetary gear system 200 also includes two reaction rings, or bands, 216 that are operatively engaged with the compound planet gears 106. These reaction rings serve to maintain, facilitate, or otherwise ensure operative meshing of the compound planet gears with the non-fixed annular gear and the non-fixed sun gear. In the illustrated example, an upper reaction ring is positioned on the radially inward side of the compound planet gears between the upper gear stages 202 and the middle gear stages 204, and a lower reaction ring is positioned on the radially inward side of the compound planet gears between the middle gear stages 204 and the lower gear stages 206. Also within the scope of the present disclosure are reaction rings that are positioned on the radially outward side of the compound planet gears. Moreover, other configurations, placement, and numbers of reaction rings 216 may be incorporated into planetary gear systems 100 other than a planetary gear system 200. Additionally or alternatively, as discussed herein, an optional carrier may be provided that interconnects the compound planet gears of a planetary gear system 100, including a planetary gear system 200.

Figure 8:
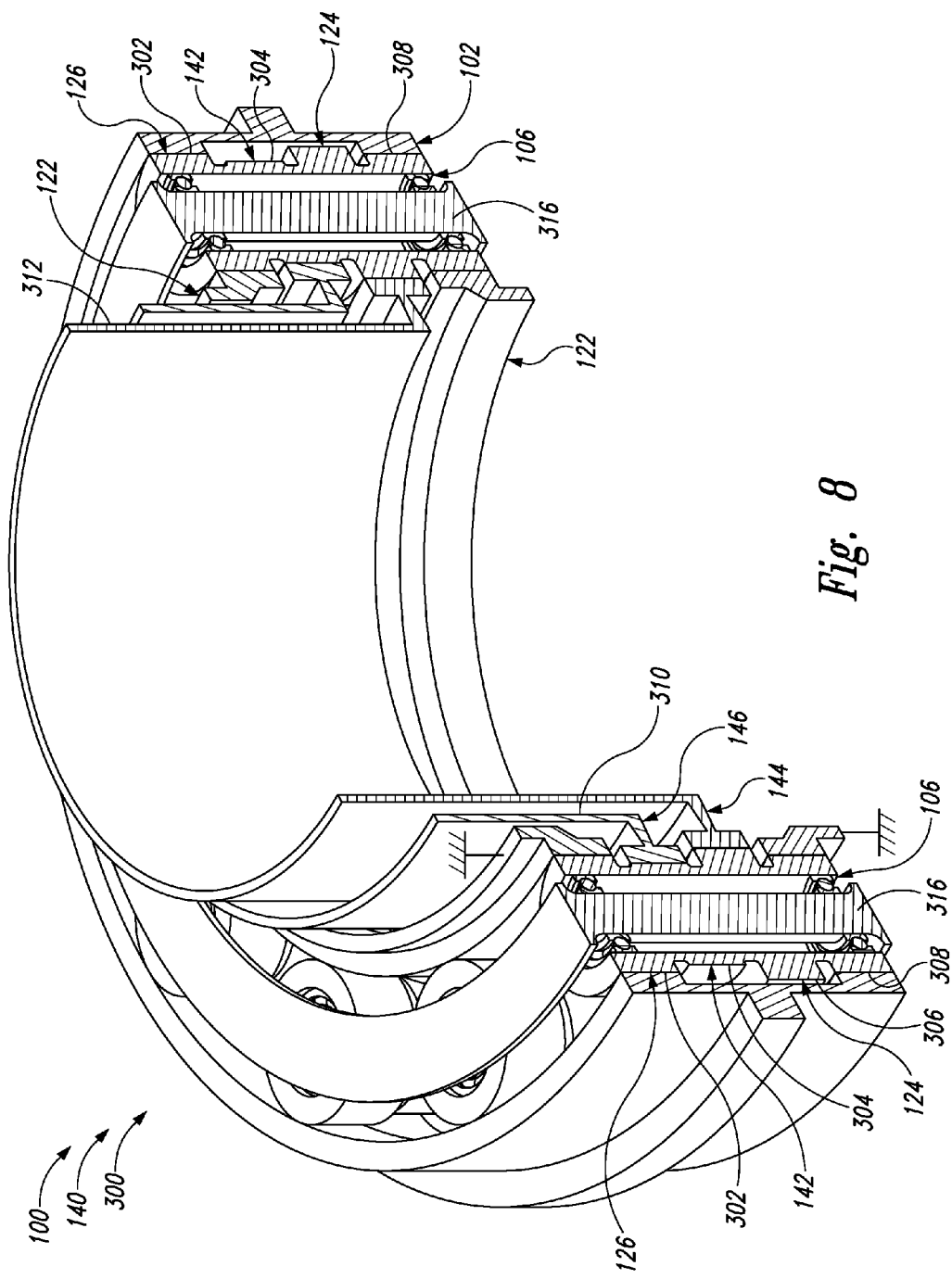
FIG. 8 is an isometric cross-sectional view of another example of a planetary gear system according to the present disclosure.

Turning now to the illustrative, non-exclusive example of FIG. 8, planetary gear system 300 is an example of a planetary gear system 140, such as schematically illustrated in FIG. 5 and discussed herein. The compound planet gears 106 of planetary gear system 300 each include an uppermost gear stage 302, an upper middle gear stage 304, a lower middle gear stage 306, and a lowermost gear stage 308. The uppermost gear stages and the lowermost gear stages have the same pitch diameter and are meshed between the fixed sun gear 122 and the non-fixed annular gear 102, the upper middle gear stages are meshed with the second non-fixed sun gear 146, and the lower middle gear stages are meshed with the first non-fixed sun gear 144. In this example, the lower middle gear stage of each compound planet gear defines the larger planet gear stage 124. The uppermost and lowermost gear stages of each compound planet gear collectively define the smaller planet gear stage 126 and by being positioned as the uppermost and lowermost gear stages serve to balance gear mesh forces acting on the compound planet gears 106. The upper middle gear stage of each compound planet gear defines the smallest planet gear stage 142. However, other variations of planetary gear systems 140, as discussed herein, may be configured similarly to planetary gear system 300.

Planetary gear system 300 includes a carrier 316 interconnecting the compound planet gears 106 rather than including reaction rings as in the example of planetary gear system 200 of FIG. 7. The carrier constrains the compound planet gears and serves to maintain, facilitate, and/or otherwise ensure operative meshing of the compound planet gears with the non-fixed annular gear and the non-fixed sun gears. Unlike prior art planetary gear systems, the carrier of planetary gear system 300 is not used as an input or output.

The second non-fixed sun gear 146 of planetary gear system 300 defines a central bore 310, and the first non-fixed sun gear 144 defines a shaft 312 that extends through the central bore. Variations on planetary gear system 300 may include the reverse configuration, with the second non-fixed sun gear having a shaft that extends through a central bore of the first non-fixed sun gear.

Figure 9:
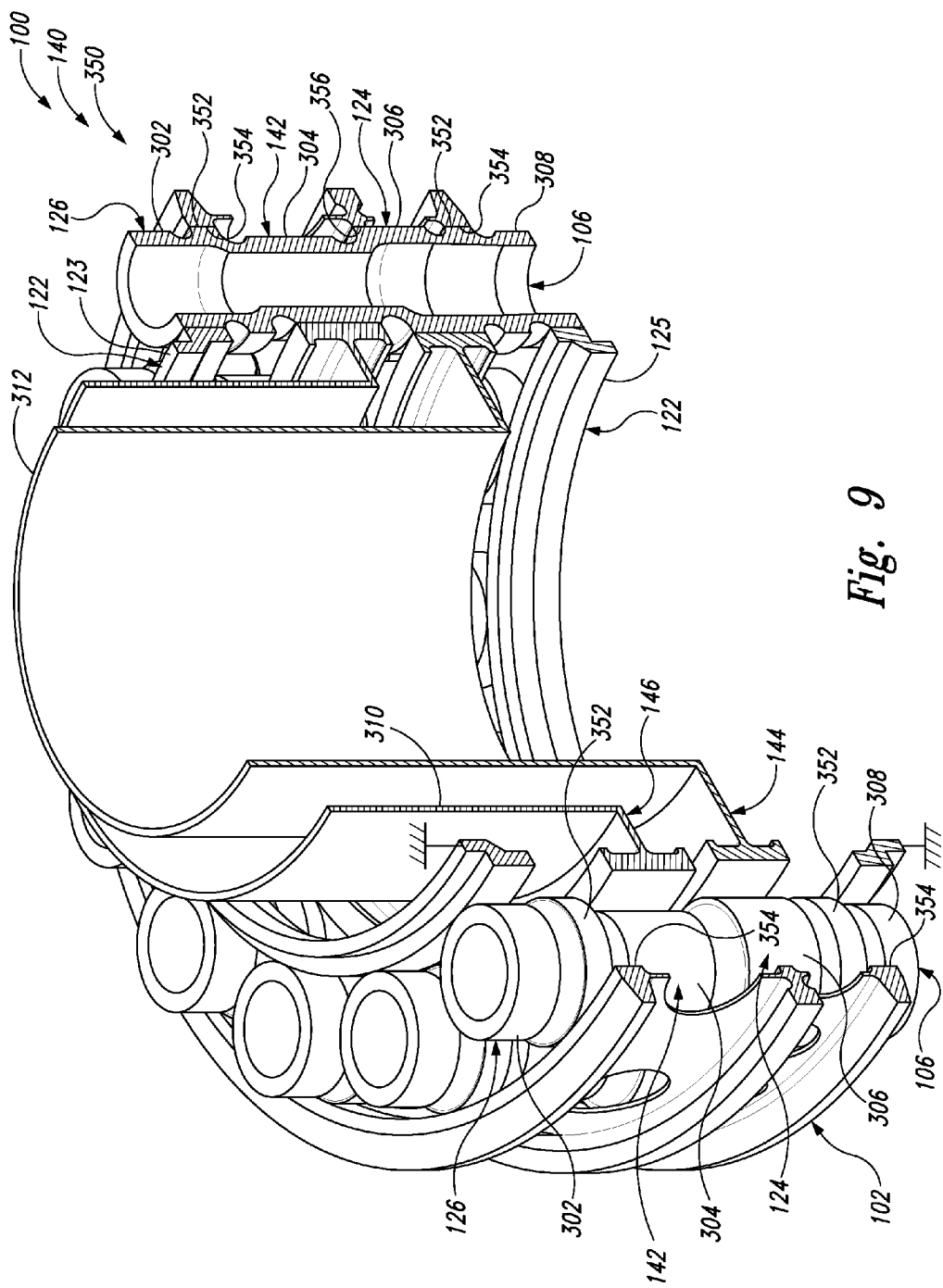
FIG. 9 is an isometric cross-sectional view of another example of a planetary gear system according to the present disclosure.

Turning now to the illustrative, non-exclusive example of FIG. 9, planetary gear system 350 is another example of a planetary gear system 140, such as schematically illustrated in FIG. 5 and discussed herein. Similar to planetary gear system 300 of FIG. 8, the compound planet gears 106 of planetary gear system 350 each include an uppermost gear stage 302, an upper middle gear stage 304, a lower middle gear stage 306, and a lowermost gear stage 308. The uppermost gear stages and the lowermost gear stages have the same pitch diameter and are meshed with the fixed sun gear 122 only. In the illustrated example, the fixed sun gear 122 is constructed in two parts, an upper portion 123 and a lower portion 125 to overcome a tipping moment that results from the output mesh forces in opposite directions. The upper middle gear stages are meshed with the second non-fixed sun gear 146. The lower middle gear stages are meshed between the first non-fixed sun gear 144 and the non-fixed annular gear 102, the non-fixed annular gear having a gear section 356, as indicated in FIG. 9. In this example, the lower middle gear stage of each compound planet gear defines the larger planet gear stage 124, the uppermost and lowermost gear stages of each compound planet gear collectively define the smaller planet gear stage 126, and the upper middle gear stage of each compound planet gear defines the smallest planet gear stage 142.

In addition to including the various gear stages, the compound planet gears of planetary gear system 350 also include two spaced-apart bearing surfaces 352, and the non-fixed annular gear 102 includes corresponding two spaced-apart bearing races 354 and that are directly engaged with the bearing surfaces of the compound planet gears. The bearing surfaces and corresponding bearing races do not include teeth and have diameters that mirror and/or correspond to the pitch diameters of the larger planet gear stages 124 and the gear section 356 of the non-fixed annular gear 102. Accordingly, these surfaces react radial loads only and overcome the centrifugal forces pulling each planet gear outward to keep each planet gear operatively meshed with the sun gears. These bearing surfaces ensure operative meshing of the compound planet gears, thus not requiring a carrier as in the example of planetary gear system 300 of FIG. 8 and planetary gear system 800 of FIG. 10 or reaction rings as in the example of planetary gear system 200 of FIG. 7.

Similar to planetary gear system 300, the second non-fixed sun gear 146 of planetary gear system 350 defines a central bore 310, and the first non-fixed sun gear 144 defines a shaft 312 that extends through the central bore.

Figure 10:
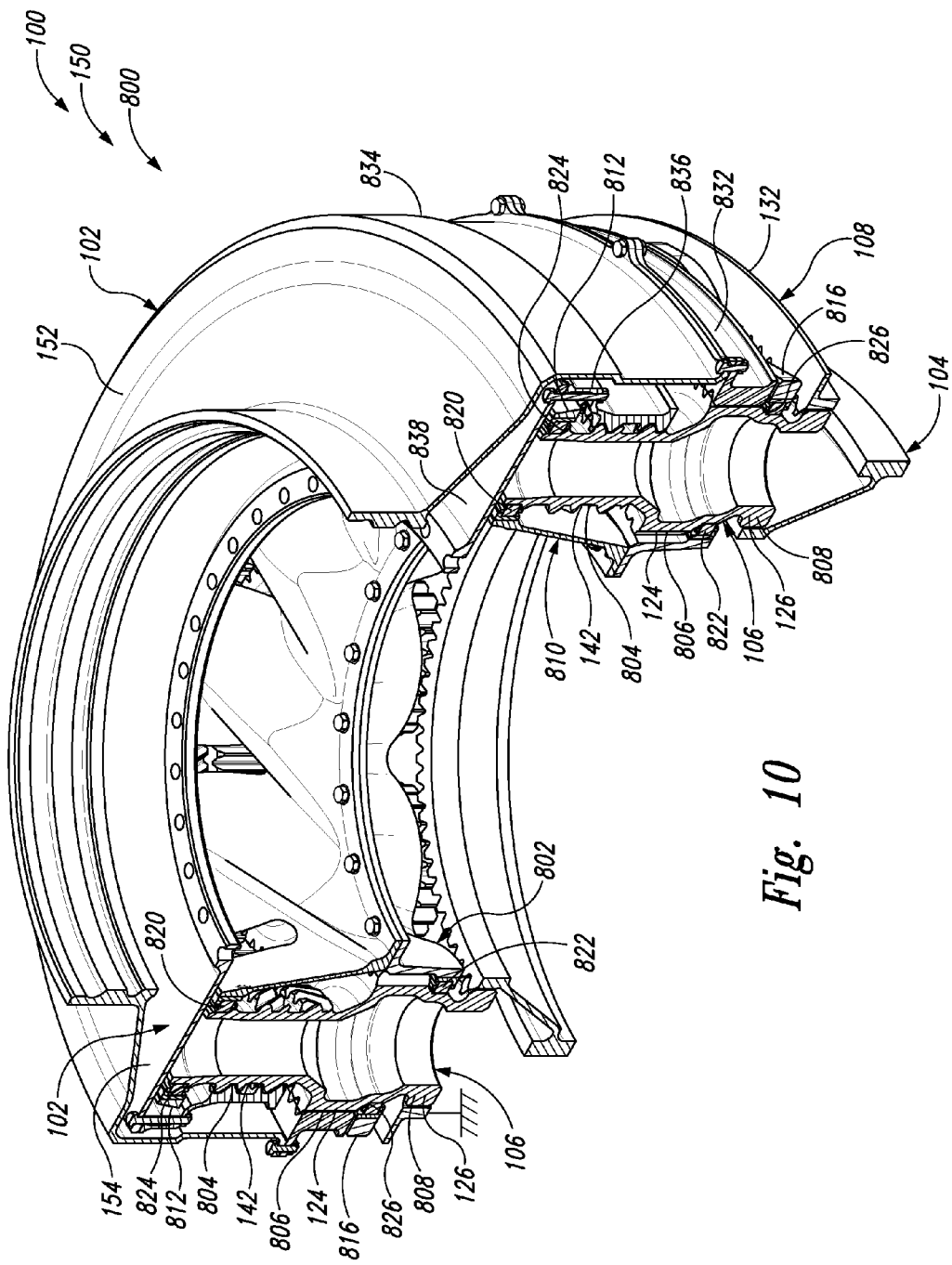
FIG. 10 is an isometric cross-sectional and fragmentary view of another example of a planetary gear system according to the present disclosure.

Turning now to the illustrative, non-exclusive example of FIG. 10, planetary gear system 800 is an example of a planetary gear system 150, such as schematically illustrated in FIG. 6 and discussed herein. More specifically, planetary gear system 800 includes two non-fixed annular gears 102, a single non-fixed sun gear 104, twelve compound planet gears 106, a fixed gear 108 in the form of a fixed annular gear 132, and a carrier 802. The two non-fixed annular gears include a first non-fixed annular gear 152 and a second non-fixed annular gear 154. While the illustrated example of FIG. 10 includes twelve compound planetary gears 106, any suitable number of compound planetary gears may be incorporated into a planetary gear system otherwise having a similar configuration to the example planetary gear system 800 illustrated and described herein.

Figure 11:
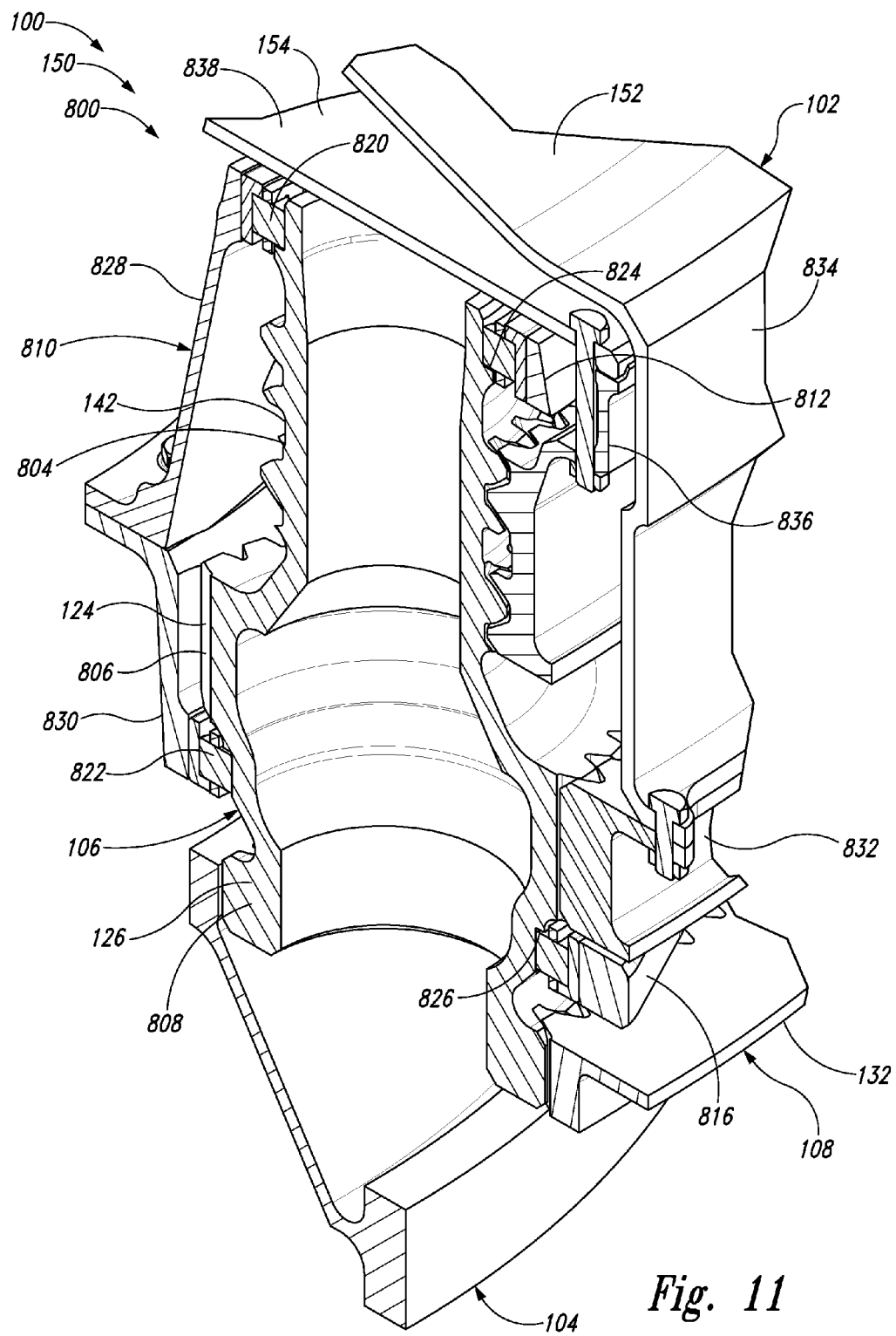
FIG. 11 is an isometric cross-sectional and fragmentary view of a portion of the planetary gear system of FIG. 10.
Figure 12:
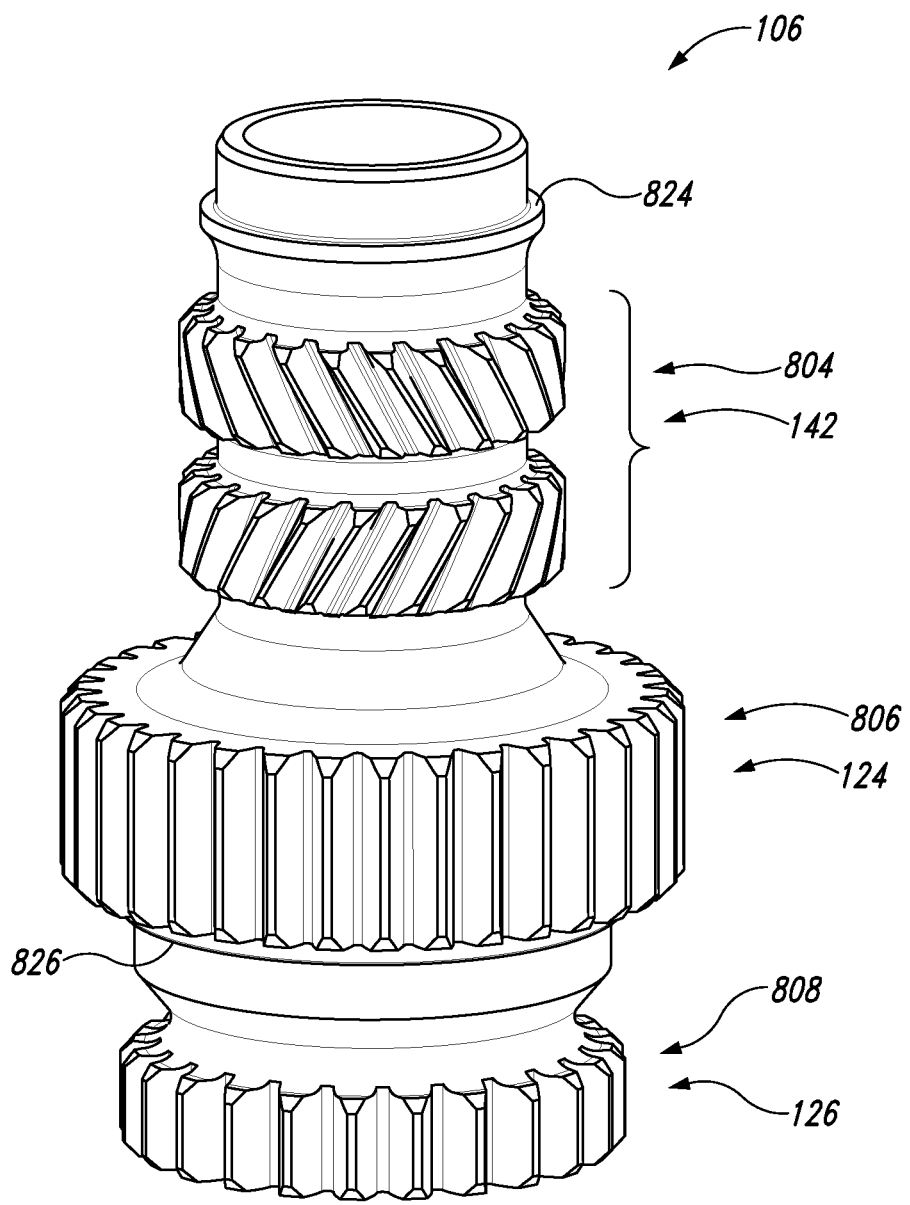
FIG. 12 is an isometric view of a compound planet gear of the planetary gear system of FIG. 10.

The compound planet gears 106 of planetary gear system 800 each include an upper gear stage 804, a middle gear stage 806, and a lower gear stage 808, as perhaps best seen in FIGS. 11-12. As best seen in FIG. 11, the upper gear stages are meshed with the second non-fixed annular gear 154, the middle gear stages are meshed with the first non-fixed annular gear 152, and the lower gear stages are meshed between the non-fixed sun gear 104 and the fixed annular gear 132. In this example, the middle gear stage of each compound planet gear defines the larger planet gear stage 124, the lower gear stage of each compound planet gear defines the smaller planet gear stage 126, and the upper gear stage of each compound planet gear defines the smallest planet gear stage 142. Additionally, as best seen with reference to FIGS. 11-12, the upper gear stages 804 of the compound planet gears 106 and the second non-fixed annular gear 154 with which the upper gear stages are meshed have double helical tooth configurations. In contrast, the middle gear stages 806 and the lower gear stages 808 of the compound planet gears 106 have spur tooth configurations, as do the first non-fixed annular gear 152, the fixed annular gear 132, and the non-fixed sun gear 104 with which they are meshed. However, other variations of planetary gears systems 150, as discussed herein, are within the scope of the present disclosure, including planetary gear systems 150 configured similarly to planetary gear system 800 but with different tooth mesh configurations, such as (but not limited to) having the first non-fixed annular gear 152 meshed with the middle gear stages 806 in a double helical configuration, while the second non-fixed annular gear 154 and the upper gear stages 804 have spur tooth configurations.

As mentioned, planetary gear system 800 includes a carrier 802. The carrier interconnects the compound planet gears 106, constrains the compound planet gears, and serves to maintain, facilitate, and/or otherwise ensure operative meshing of the compound planet gears with the non-fixed annular gears 102, the non-fixed sun gear 104, and the fixed annular gear 132. With reference to both FIG. 10 and FIG. 13, carrier 802 includes an inner wall 810 positioned radially inward from the compound planet gears, an upper radial flange 812 extending radially outward from the inner wall and that defines upper bores 814, and a lower radial flange 816 extending radially outward from the inner wall and that defines lower bores 818, with the upper and lower bores corresponding to the twelve compound planet gears 106. That is, the compound planet gears are positioned within respective upper and lower bores of the radial flanges of the carrier. The inner wall 810 may be described as being generally cylindrical and defining a hollow shaft that extends generally vertically and that is positioned radially inward from the compound planet gears 106.

Planetary gear systems 800 also include upper bearing elements 820 (optionally roller bearings) supported within the upper bores 814 between the carrier 802 and the compound planet gears, and lower bearing elements 822 (optionally roller bearings) supported within the lower bores 818 between the carrier and the compound planet gears, such that the compound planet gears rotate about their respective axes of rotation 112 relative to the carrier and such that the compound planet gears collectively orbit about the primary rotation axis 110 of the planetary gear system 800 with rotation of the carrier about the primary rotation axis.

In the illustrated example, the upper radial flange 812 and the upper bearing elements 820 are positioned above the upper gear stages 804 of the compound planet gears 106, and the lower radial flange 816 and the lower bearing elements 822 are positioned between the middle gear stages 806 and the lower gear stages 808 of the compound planet gears. However, other configurations of a carrier may be used with planetary gear systems similar to planetary gear system 800.

As seen with reference to FIGS. 11-12, each compound planet gear 106 of planetary gear system 800 includes an upward facing shoulder 824 that prevents vertical movement of a compound planet gear past the respective upper bearing element 820, and a downward facing shoulder 826 that prevents vertical movement of a compound planet gear past the respective lower bearing element 822 in the opposite direction. Because the upper and lower bearing elements are operatively supported within the upper and lower bores of the carrier, respectively, the upper and lower shoulders vertically constrain the carrier relative to the compound planet gears. Additionally, the second non-fixed annular gear 154 is vertically constrained to each compound planet gear 106 due to the double helical gear geometry of the upper gear stage 804 that exhibits positive axial engagement. As such, the carrier, the compound planet gears, and the second non-fixed annular gear are vertically constrained together to facilitate appropriate structural support and axial constraint. As a non-exclusive example, the upper portion 838 of the second non-fixed annular gear 154 may be designed with sufficient strength to vertically support the second non-fixed annular gear, the compound planet gears, and the carrier. This approach results in planetary gear system 800 being more closely coupled to an output shaft connected to the second non-fixed annular gear. Alternatively, the carrier could be vertically supported by a rotating bearing element mounted on a separate housing (e.g., a gearbox housing), which would also vertically locate the compound planet gears and the second non-fixed annular gear. This alternative approach may be helpful in isolating the planetary system from output shaft deflections which may reduce rotor shaft stiffness/support requirements. Additionally or alternatively, the second non-fixed annular gear 154 could be vertically supported by a rotating bearing element from the first non-fixed annular gear 152, which in turn could be vertically supported by a rotating bearing element mounted on a separate housing (e.g., a gearbox housing). This alternative approach may isolate the planetary system from output shaft deflections, but may complicate a gearbox assembly due to bearing elements nested between the first and second non-fixed annular gears. In summary, different configurations of planetary gear systems similar to planetary gear system 800 may create need for different mounting schemes to vertically locate the compound planet gears, carrier, and upper non-fixed annular gear, inclusive or exclusive of the examples discussed herein.

Figure 13:
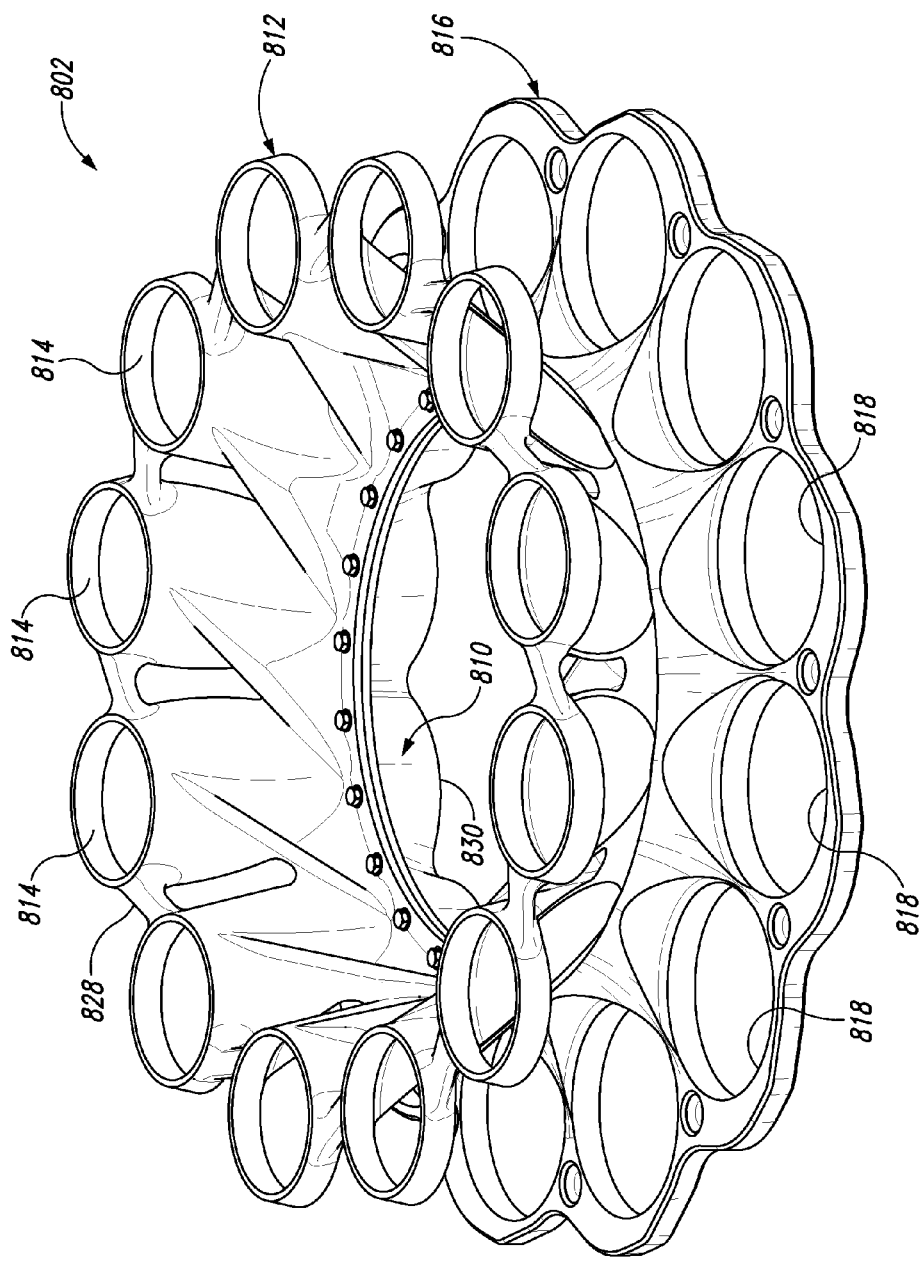
FIG. 13 is an isometric view of the carrier of the planetary gear system of FIG. 10.

Although not required, carrier 802 is constructed in two parts, including an upper portion 828 and a lower portion 830 coupled to the upper portion, as seen in FIGS. 10-11 and 13. The upper portion 828 includes the upper radial flange 812, and the lower portion 830 includes the lower radial flange 816. Such a two-part construction may facilitate assembly of planetary gear system 800. Moreover, a two-piece construction enables upper bores 814 and lower bores 818 to fully encapsulate upper bearing elements 820 and lower bearing elements 822 of adequate size that would otherwise prevent installation of the first non-fixed annular gear 152. Carrier 802 may be constructed of steel to accommodate load transfer through the fastened joint between the upper and lower portions, which tends to concentrate loads and increase material stress in the carrier components.

Figure 14:
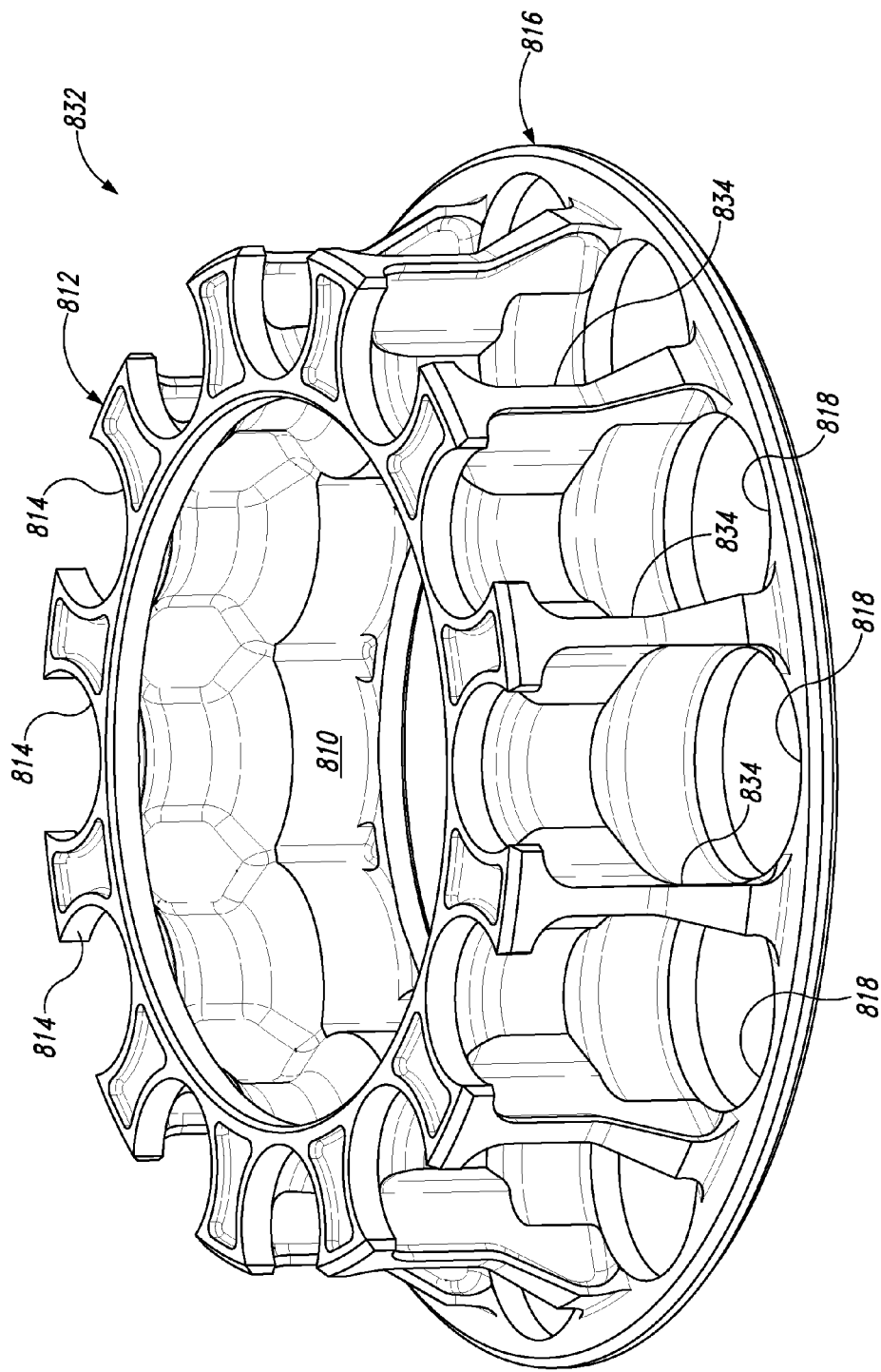
FIG. 14 is an isometric view of an alternative carrier that may be used with the planetary gear system of FIG. 10.

However, a carrier constructed as a one-piece, or monolithic, component also may be used, and FIG. 14 illustrates a non-exclusive example of such a one-piece carrier 832. Carrier 832 includes an inner wall 810, an upper radial flange 812, a lower radial flange 816, and vertical webs 834 that extend between the upper radial flange and the lower radial flange and between adjacent compound planet gears 106 when assembled in a planetary gear system. Although not required in a one-piece carrier, the upper bores 814 of the upper radial flange 812 of carrier 832 do not extend a full 360°, and instead extend approximately 235°. However, any configuration of bores greater than 180° and that operatively retains corresponding bearing elements may be provided in a carrier. Moreover, such configurations of bores are not limited to one-piece carriers, and also may be incorporated into two-piece carriers, as well. As a one-piece construction, the distribution of material between upper bores 814 and lower bores 818 is not constrained by carrying loads through a mechanically fastened joint. As a result, stress concentrations associated with a mechanically fastened joint can be avoided, which enables a use of lighter materials with reduced strength properties such as titanium (or aluminum). Materials with a lower density will occupy more volume for a given weight which enables more expansive and stiffer carrier geometry. Accordingly, carrier 832 may be generally stiffer (resulting in better gear alignment) than carrier 802. Compared to carrier 832, carrier 802 may have improved material support local to upper bores 814 and may be better suited for certain configurations of planetary gear systems 150 that exert greater outward forces on upper bores 814 (that is, have larger and/or heavier compound planet gears 106). In addition a one-piece carrier avoids tolerance stack-up between two parts, so that a tighter tolerance between the upper and lower bores may be accomplished.

As seen in FIG. 10, the non-fixed annular gears 152, 154 are constructed to extend upward from their respective mesh with the compound planet gears 106 and wrap-around, or extend over, the compound planet gears and the carrier 802 for operative coupling to associated output shafts having diameters less than the non-fixed annular gears themselves. In planetary gear system 800, the non-fixed annular gears 152, 154 are each constructed in two parts. More specifically, the first non-fixed annular gear 152 includes a lower portion 832 that includes the gear teeth and an upper portion 834 that is coupled to the lower portion and that extends upward and over the compound planet gears and the carrier. Similarly, the second non-fixed annular gear 154 includes a lower portion 836 that includes the gear teeth and an upper portion 838 that is coupled to the lower portion and that extends upward and over the compound planet gears and the carrier. However, such two-part constructions are not required to all embodiments.

Planetary gear system 800 is configured such that Equations 2-8 apply. More specifically, as an illustrative, non-exclusive example of a planetary gear system 800, the fixed annular gear 132 may have 156 teeth and a pitch diameter of 27.6106 in.; the smaller planet gear stage 126 may have 24 teeth and a pitch diameter of 4.2478 in.; the non-fixed sun gear 104 may have 108 teeth and a pitch diameter of 19.1150 in.; the first non-fixed annular gear 152 may have 182 teeth and a pitch diameter of 28.7302 in.; the larger planet gear stage 124 may have 34 teeth and a pitch diameter of 5.3672 in.; the second non-fixed annular gear 154 may have 182 teeth and a pitch diameter of 26.5752; and the smallest planet gear stage 142 may have 22 teeth and a pitch diameter of 3.2124 in.

In addition, planetary gear system 800 may have a rotational input to rotational output ratio (that is, rotational frequency of non-fixed sun gear 104 over the rotational frequency of the non-fixed annular gears 152, 154) of about 11.4; however, planetary gear systems 150 may be configured similarly to planetary gear systems 800, but having a different input to output ratio, including (but not limited to) input to output ratios less than 11.4, greater than 11.4, and within such ranges as 5-80, 5-60, 5-40, and 5-20. While input to output ratios as high as 80 are possible, such high input speeds typically create dynamic and power loss challenges in the design of a planetary gear system. In connection with planetary gear system 800, an input to output ratio of 11.4 was selected only after significant work in sizing different configurations. The ratio of 11.4 proved to be a good balance between ratio, input speed (tangential velocity), and heat rejection (power loss). Moreover, significant work was required to arrive at a total of twelve compound planet gears of the size disclosed (as opposed to fewer, larger compound planet gears) to strike a balance between weight (load share) and efficiency (carrier speed from smaller planets). For example, the compound planet gears react torque loads from one non-fixed annular gear and transfer to the other counter-rotating non-fixed annular gear, loading one output against the other, and thereby minimizing the transfer of loads into other portions of the system. Loads from the non-fixed annular gears enter the compound planet gears and travel through the compound planet gears in a local area, largely without being transferred to the bearing elements between the compound planet gears and the carrier. Therefore, the bearing elements are not directly involved in providing power to the output of the non-fixed annular gears. In planetary gear system 800, the compound planet gears have a precision fixed angular orientation between gear features. When assembling planetary gear system 800, the compound planet gears are meshed to the double helical gear of the second non-fixed annular gear with a radial engagement, followed by the carrier being assembled to capture the compound planet gears and the bearing elements.

As mentioned, also within the scope of the present disclosure are transmissions and apparatuses that include planetary gear systems 100 according to the present disclosure. Turning now to FIG. 14, transmissions according to the present disclosure are schematically represented and indicated generally at 400. Transmissions 400 include at least a planetary gear system 100, an input shaft 402, an output shaft 404, and a frame, or housing, 406. The input shaft is operatively coupled to one of a non-fixed sun gear or a non-fixed annular gear of the planetary gear system, and the output shaft likewise is operatively coupled to one of a non-fixed sun gear or a non-fixed annular gear of the planetary gear system. The housing is operatively coupled to the fixed gear of the planetary gear system. Accordingly, rotation of the input shaft results in an opposite rotation of the output shaft, as schematically represented by the arrows in FIG. 14.

In examples of planetary gear systems 100 that are configured so that a rotational input of a non-fixed gear results in rotational outputs of two, separate, coaxial non-fixed gears, as discussed herein, a corresponding transmission 400 may include a second output shaft 408 that is coaxial with and that rotates in an opposite direction of output shaft 404 in response to the rotation of the input shaft 402, as schematically and optionally illustrated in dashed lines in FIG. 14.

With continued reference to FIG. 14, apparatuses according to the present disclosure are schematically represented and indicated generally at 500. Apparatuses 500 include at least a body 502, a transmission 400 supported by the body, an input 504 operatively supported by the body and operatively coupled to the input shaft 402 of the transmission, and one or more outputs 506 operatively coupled to the output shaft(s) 408 of the transmission. Alternatively, input 504 may be in the form of an output, and output(s) 506 may be in the form of input(s). Apparatuses 500 according to the present disclosure may take any suitable form and perform any suitable application. As illustrative, non-exclusive examples, apparatuses may include vehicles, including land vehicles, marine vehicles, air vehicles, and space vehicles; machines, including machines used in manufacturing; energy generating equipment, including wind turbines and water turbines; pumps; etc. In the example of an apparatus 500 in the form of an air vehicle, the input 504 may include an engine, the output(s) 506 may include one or more rotors or propellers, and the body may include a fuselage. In the example of an apparatus in the form of a wind turbine, the input may be in the form of one or more rotors, the output may be in the form of a generator, and the body may be in the form of a mast. Other types and configurations of apparatuses 500 also are within the scope of the present disclosure.

Figure 15:
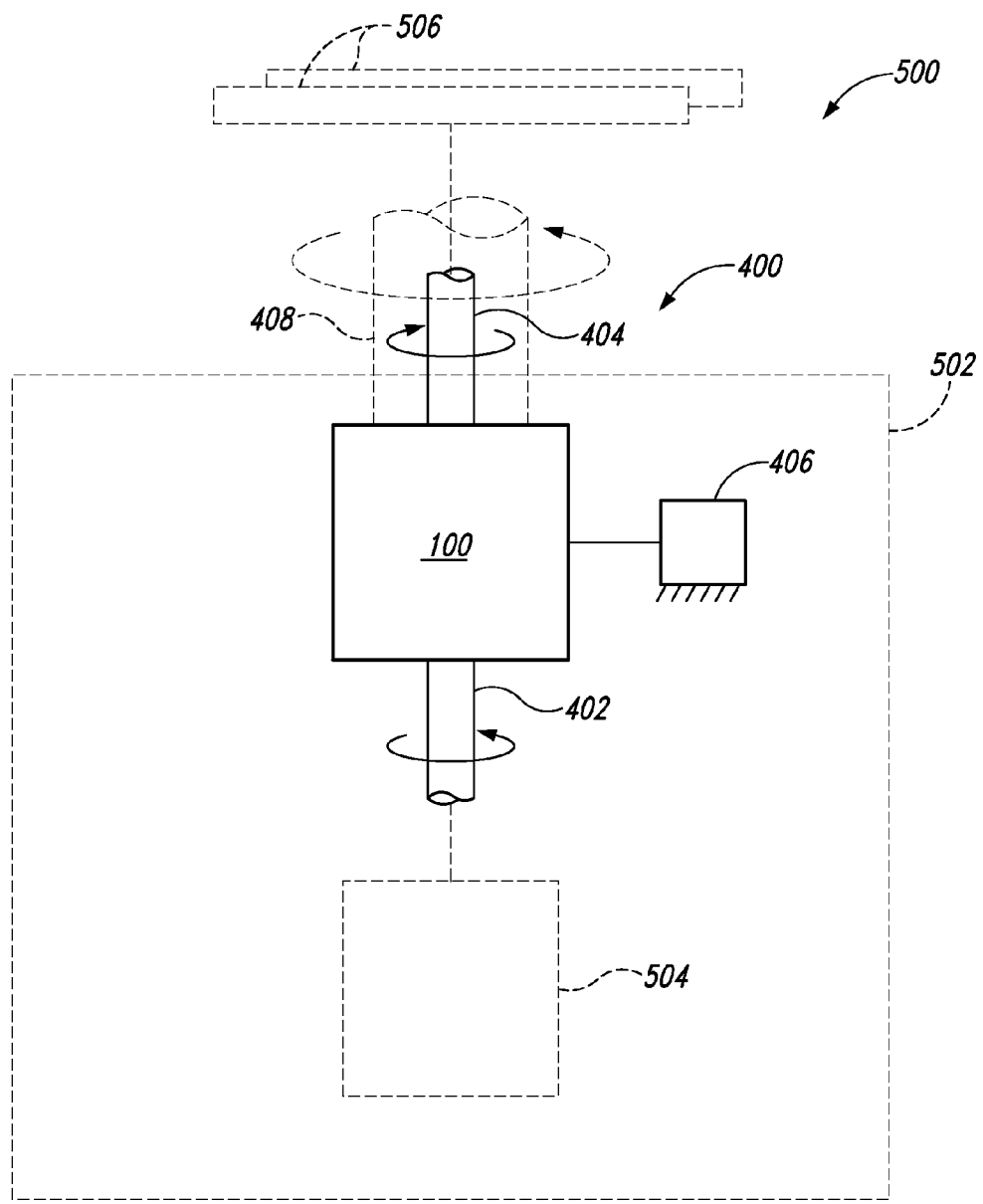
FIG. 15 is a schematic diagram representing transmissions and related apparatuses according to the present disclosure that incorporate a planetary gear system according to the present disclosure.
Figure 16:
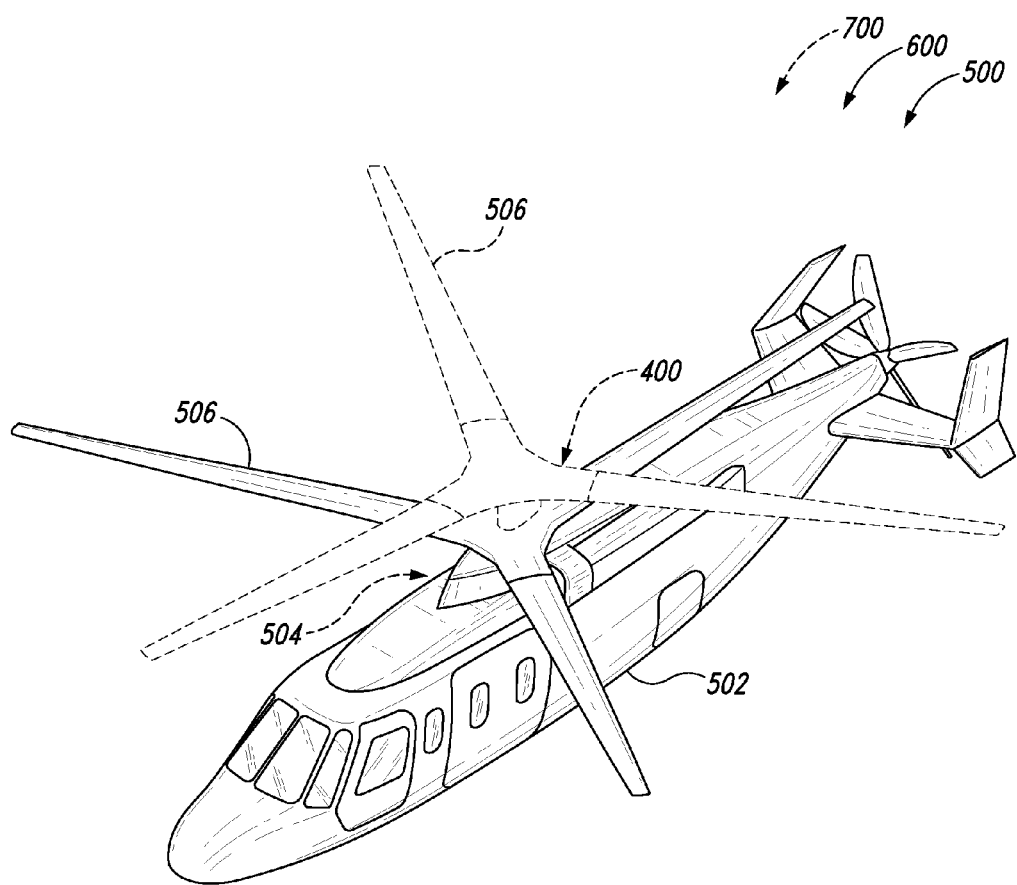
FIG. 16 is a perspective view of an example of a rotorcraft according to the present disclosure.
Figure 17:
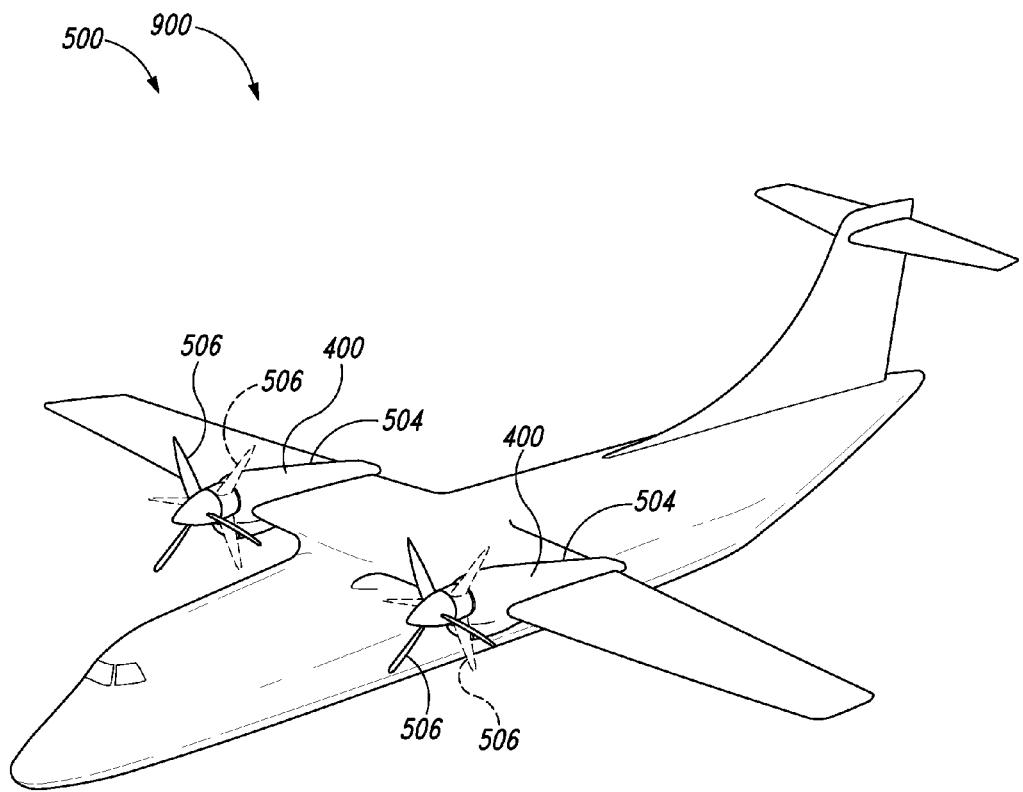
FIG. 17 is a perspective view of an example fixed wing aircraft according to the present disclosure.

As an illustrative, non-exclusive example, FIG. 15 illustrates example apparatuses 500 in the form of rotorcraft, including a single rotor helicopter 600 with a single output 506 in the form of a rotor and a double, coaxial rotor helicopter 700 with two outputs 506 in the form of rotors. As another illustrative, non-exclusive example, FIG. 16 illustrates example apparatuses 500 in the form of fixed wing aircraft 900, including a transmission 400 supported by each wing. In one example, each transmission may be coupled to a single output 506 in the form of a single propeller, and in another example, each transmission may be coupled to two outputs 506 in the form of counter-rotating, coaxial propellers.

Illustrative, non-exclusive examples of inventive subject matter according to the present disclosure are described in the following enumerated paragraphs:

A. A planetary gear system, comprising:
a non-fixed annular gear configured to rotate about a primary rotation axis;

a non-fixed sun gear configured to rotate about the primary rotation axis;

a compound planet gear operatively positioned between and meshed with the non-fixed annular gear and the non-fixed sun gear, wherein the compound planet gear includes a larger planet gear stage having a larger pitch diameter and a smaller planet gear stage operatively connected to the larger planet gear stage and having a smaller pitch diameter less than the larger pitch diameter, wherein one of the larger planet gear stage and the smaller planet gear stage is operatively meshed with the non-fixed sun gear, and wherein one of the larger planet gear stage and the smaller planet gear stage is operatively meshed with the non-fixed annular gear; and a fixed gear having a central axis coaxial with the primary rotation axis, wherein the fixed gear is one of:
    a fixed sun gear operatively meshed with one of the larger planet gear stage and the smaller planet gear stage; and
    a fixed annular gear operatively meshed with one of the larger planet gear stage and the smaller planet gear stage.

A1. The planetary gear system of paragraph A, wherein the larger planet gear stage is operatively meshed with the non-fixed annular gear.

A2. The planetary gear system of paragraph A, wherein the smaller planet gear stage is operatively meshed with the non-fixed annular gear.

A3. The planetary gear system of any of paragraphs A-A2, wherein the fixed gear is the fixed sun gear operatively meshed with one of the larger planet gear stage and the smaller planet gear stage.

A4. The planetary gear system of any of paragraphs A-A2, wherein the fixed gear is the fixed annular gear operatively meshed with one of the larger planet gear stage and the smaller planet gear stage.

A4.1. The planetary gear system of paragraph A4, wherein the compound planet gear includes an upper gear stage, a middle gear stage, and a lower gear stage, wherein the upper gear stage and the lower gear stage are meshed with the fixed annular gear, and wherein the middle gear stage is meshed with the non-fixed annular gear and the non-fixed sun gear.

A4.1.1. The planetary gear system of paragraph A4.1, wherein the larger planet gear stage includes the upper gear stage and the lower gear stage, and wherein the smaller planet gear stage includes the middle gear stage.

A4.1.2. The planetary gear system of paragraph A4.1, wherein the smaller planet gear stage includes upper gear stage and the lower gear stage, and wherein the larger planet gear stage includes the middle gear stage.

A4.1.3. The planetary gear system of any of paragraphs A4.1-A4.1.2, wherein the non-fixed sun gear defines a central bore, and wherein the fixed annular gear extends over the compound planet gear and defines a shaft that extends through the central bore of the non-fixed sun gear.

A5. The planetary gear system of any of paragraphs A-A4, wherein the compound planet gear further includes a smallest planet gear stage operatively connected to the larger planet gear stage and the smaller planet gear stage and having a smallest pitch diameter less than the smaller pitch diameter;
    wherein one of:
        (i) the non-fixed sun gear is a first non-fixed sun gear and the planetary gear system further comprises a second non-fixed sun gear configured to rotate about the primary rotation axis and operatively meshed with the smallest planet gear stage; and
        (ii) the non-fixed annular gear is a first non-fixed annular gear and the planetary gear system further comprises a second non-fixed annular gear configured to rotate about the primary rotation axis and operatively meshed with the smallest planet gear stage.

A5.1. The planetary gear system of paragraph A5, wherein the non-fixed sun gear is a first non-fixed sun gear and the planetary gear system further comprises a second non-fixed sun gear configured to rotate about the primary rotation axis and operatively meshed with the smallest planet gear stage.

A5.1.1 The planetary gear system of paragraph A5.1, wherein the fixed gear is the fixed sun gear; and
    wherein the compound planet gear includes an uppermost gear stage, an upper middle gear stage, a lower middle gear stage, and a lowermost gear stage, wherein the uppermost gear stage and the lowermost gear stage are meshed with the non-fixed annular gear and the fixed sun gear, wherein the upper middle gear stage is meshed with one of the first non-fixed sun gear and the second non-fixed sun gear, and wherein the lower middle gear stage is meshed with the other of the first non-fixed sun gear and the second non-fixed sun gear.

A5.1.1.1. The planetary gear system of paragraph A5.1.1, wherein the larger gear stage includes the lower middle gear stage, wherein the smaller gear stage includes the uppermost gear stage and the lowermost gear stage, and wherein the smallest gear stage includes the upper middle gear stage.

A5.1.1.2. The planetary gear system of paragraph A5.1.1, wherein the larger gear stage includes the upper middle gear stage, wherein the smaller gear stage includes the uppermost gear stage and the lowermost gear stage, and wherein the smallest gear stage includes the lower middle gear stage.

A5.1.2. The planetary gear system of any of paragraphs A5.1-A5.1.1.2, wherein one of the first non-fixed sun gear and the second non-fixed sun gear defines a central bore, and wherein the other of the first non-fixed sun gear and the second non-fixed sun gear defines a shaft that extends through the central bore.

A5.1.3 The planetary gear system of any of paragraphs A5.1-A5.1.1.2, wherein a rotational input to the non-fixed annular gear results in opposite rotational outputs of the first non-fixed sun gear and the second non-fixed sun gear at the same (or substantially the same) frequency of rotation.

A5.2. The planetary gear system of paragraph A5, wherein the non-fixed annular gear is a first non-fixed annular gear and the planetary gear system further comprises a second non-fixed annular gear configured to rotate about the primary rotation axis and operatively meshed with the smallest planet gear stage.

A5.2.1. The planetary gear system of paragraph A5.2, wherein the fixed gear is the fixed annular gear.

A5.2.2. The planetary gear system of any of paragraphs A5.2-A5.2.1, wherein a rotational input to the non-fixed sun gear results in opposite rotational outputs of the first non-fixed annular gear and the second non-fixed annular gear at the same (or substantially the same) frequency of rotation.

A6. The planetary gear system of any of paragraphs A-A5.2.2, further comprising:
    a plurality of compound planet gears operatively positioned between, meshed with, and spaced around the non-fixed annular gear and the non-fixed sun gear.

A6.1. The planetary gear system of paragraph A6, further comprising:
    a carrier that interconnects the plurality of compound planet gears.

A6.1.1. The planetary gear system of paragraph A6.1, wherein the carrier does not define an input or an output of the planetary gear system.

A6.2. The planetary gear system of paragraph A6, wherein the planetary gear system is free of a carrier that interconnects the plurality of compound planet gears.

A6.3. The planetary gear system of any of paragraphs A6-A6.1, wherein the planetary gear system is free of roller bearings associated with the plurality of compound planet gears.

A6.4. The planetary gear system of any of paragraphs A6-A6.3, further comprising:

a reaction ring operatively engaged with the plurality of compound planet gears and configured to maintain operative meshing of the plurality of compound planet gears with the non-fixed annular gear and the non-fixed sun gear.

A7. The planetary gear system of any of paragraphs A-A6.4, wherein at least a subset of the gears defines double helical mesh configurations and/or C-gear configurations.

A8. The planetary gear system of any of paragraphs A-A7, wherein the non-fixed annular gear and the non-fixed sun gear are each configured to continuously rotate 360 degrees about the primary rotation axis.

A9. The planetary gear system of any of paragraphs A-A8, wherein the compound planet gear includes at least one bearing surface, and wherein the non-fixed annular gear includes at least one bearing race engaged with the at least one bearing surface.

B. A planetary gear system comprising at least one non-fixed annular gear, at least one non-fixed sun gear, at least one compound planet gear meshed between the at least one non-fixed annular gear and the at least one non-fixed sun gear, and at least one fixed gear meshed with the at least one compound planet gear, wherein a rotational input to one of the at least one non-fixed annular gear and the at least one non-fixed sun gear results in an opposite rotational output of the other of the at least one non-fixed annular gear and the at least one non-fixed sun gear.

B1. The planetary gear system of paragraph B further comprising the subject matter of any of paragraphs A-A9.

C. A transmission, comprising:

the planetary gear system of any of paragraphs A-B1;

an input shaft operatively coupled to one of the non-fixed annular gear and the non-fixed sun gear;

an output shaft operatively coupled to the other of the non-fixed annular gear and the non-fixed sun gear; and a housing operatively coupled to the fixed gear;

wherein rotation of the input shaft in a first rotational direction results in rotation of the output shaft in a second rotational direction opposite the first rotational direction.

C1. The transmission of paragraph C when depending from paragraph A5.1, wherein the output shaft is a first output shaft, and further wherein the first output shaft is operatively coupled to the first non-fixed sun gear, the transmission further comprising:

a second output shaft operatively coupled to the second non-fixed sun gear;

wherein rotation of the input shaft results in rotation of the first output shaft in the second rotational direction and rotation of the second output shaft in the first rotational direction.

C2. The transmission of paragraph C when depending from paragraph A5.2, wherein the output shaft is a first output shaft, and further wherein the first output shaft is operatively coupled to the first non-fixed annular gear, the transmission further comprising:

a second output shaft operatively coupled to the second non-fixed annular gear;

wherein rotation of the input shaft results in rotation of the first output shaft in the second rotational direction and rotation of the second output shaft in the first rotational direction.

D. An apparatus, comprising:

a body;

the transmission of any of paragraphs C-C2 supported by the body;

an input operatively supported by the body and operatively coupled to the input shaft of the transmission; and an output operatively coupled to the output shaft of the transmission.

D1. The apparatus of paragraph D when depending from paragraph Ca or paragraph C2, wherein the output is a first output, the apparatus further comprising:

a second output operatively coupled to the second output shaft of the transmission.

D2. The apparatus of any of paragraphs D-D1, wherein the apparatus is an aircraft, the body includes a fuselage, the input is an engine, and the output is a rotor or a propeller, and when depending from paragraph D1, wherein the first output is a first rotor or a first propeller and the second output is a second rotor or a second propeller.

E. A planetary gear system, comprising:

a plurality of compound planet gears configured to orbit around a primary rotation axis and each including three gear stages;

a first non-fixed annular gear configured to rotate about the primary rotation axis and operatively meshed with one of the three gear stages;

a second non-fixed annular gear configured to rotate about the primary rotation axis and operatively meshed with one of the three gear stages;

a fixed annular gear with a central axis that is coaxial with the primary rotation axis and operatively meshed with one of the three gear stages; and a non-fixed sun gear configured to rotate about the primary rotation axis and operatively meshed with one of the three gear stages.

E1. The planetary gear system of paragraph E, wherein the three gear stages include a larger planet gear stage having a larger pitch diameter, a smaller planet gear stage having a smaller pitch diameter less than the larger pitch diameter, and a smallest planet gear stage having a smallest pitch diameter less than the smaller pitch diameter.

E1.1. The planetary gear system of paragraph E1, wherein the larger planet gear stage of each compound planet gear is operatively meshed with the first non-fixed annular gear, wherein the smaller planet gear stage of each compound planet gear is operatively meshed with the fixed annular gear and the non-fixed sun gear, and wherein the smallest planet gear stage of each compound planet gear is operatively meshed with the second non-fixed annular gear.

E1.2. The planetary gear system of any of paragraphs E1-E1.1, wherein the larger planet gear stage of each compound planet gear is a middle gear stage, wherein the smaller planet gear stage of each compound planet gear is a lower gear stage positioned below the middle gear stage, and wherein the smallest planet gear stage of each compound planet gear is an upper gear stage positioned above the middle gear stage.

E1.3. The planetary gear system of any of paragraphs E1-E1.2, wherein one of:

the smallest planet gear stage of each compound planet gear and the second non-fixed annular gear define a double helical gear configuration or a C-gear configuration; and the larger planet gear stage of each compound planet gear and the first non-fixed annular gear define a double helical gear configuration or a C-gear configuration.

E1.4. The planetary gear system of any of paragraphs E1-E1.3, wherein one of:

the smallest planet gear stage of each compound planet gear and the second non-fixed annular gear define a spur gear configuration or a single helical gear configuration; and the larger planet gear stage of each compound planet gear and the first non-fixed annular gear define a spur gear configuration or a single helical gear configuration.

E1.5. The planetary gear system of any of paragraphs E1-E1.4, wherein one or more of:

a ratio of a tooth count of the fixed annular gear to a tooth count of the smaller planet gear stage to a tooth count of the non-fixed sun gear is (or approximately is) 156:24:108;

a ratio of a tooth count of the first non-fixed annular gear to a tooth count of the larger planet gear stage is (or approximately is) 182:34; and a ratio of a tooth count of the second non-fixed annular gear to a tooth count of the smallest planet gear stage is (or approximately is) 182:22.

E1.6. The planetary gear system of any of paragraphs E1-E1.5, wherein one or more of:

a ratio of a tooth count of the fixed annular gear to a tooth count of the smaller planet gear stage to a tooth count of the non-fixed sun gear is (or approximately is) in the range of (110-200):(18-30):(80-150);

a ratio of a tooth count of the first non-fixed annular gear to a tooth count of the larger planet gear stage is (or approximately is) in the range of (110-200):(18-40); and a ratio of a tooth count of the second non-fixed annular gear to a tooth count of the smallest planet gear stage is (or approximately is) in the range of (110-200):(20-26).

E1.7. The planetary gear system of any of paragraphs E1-E1.6, wherein one or more of:

a ratio of a pitch diameter of the fixed annular gear to a pitch diameter of the smaller planet gear stage to a pitch diameter of the non-fixed sun gear is (or approximately is) 156:24:108;

a ratio of a pitch diameter of the first non-fixed annular gear to a pitch diameter of the larger planet gear stage is (or approximately is) 182:34; and a ratio of a pitch diameter of the second non-fixed annular gear to a pitch diameter of the smallest planet gear stage is (or approximately is) 182:22.

E1.8. The planetary gear system of any of paragraphs E1-E1.7, wherein one or more of:

a ratio of a pitch diameter of the fixed annular gear to a pitch diameter of the smaller planet gear stage to a pitch diameter of the non-fixed sun gear is (or approximately is) in the range of (110-200):(18-30):(80-150);

a ratio of a pitch diameter of the larger planet gear stage to a pitch diameter of the second non-fixed annular gear is (or approximately is) in the range of (110-200):(18-40); and a ratio of a pitch diameter of the smallest planet gear stage is (or approximately is) in the range of (110-200):(20-26).

E1.9. The planetary gear system of any of paragraphs E1-E1.8, wherein one or more of a diametral pitch of the smaller planet gear stage is (or approximately is) 5.65 or approximately is 6;

a diametral pitch of the larger planet gear stage is (or approximately is) 6.3348 or approximately is 6; and a diametral pitch of the smallest planet gear stage is (or approximately is) 6.8485 or approximately is 6.

E2. The planetary gear system of any of paragraphs E-E1.9, wherein a rotational input to the non-fixed sun gear results in opposite rotational outputs of the first non-fixed annular gear and the second non-fixed annular gear at the same (or substantially the same) frequency of rotation.

E3. The planetary gear system of any of paragraphs E-E2, further comprising:

a carrier that interconnects the plurality of compound planet gears.

E3.1. The planetary gear system of paragraph E3, wherein the carrier does not define an input or an output of the planetary gear system.

E3.2. The planetary gear system of any of paragraphs E3-E3.1, wherein the carrier includes an inner wall positioned radially inward from the plurality of compound planet gears, and at least one radial flange extending radially outward from the inner wall, wherein the at least one radial flange defines a plurality of bores corresponding to the plurality of compound planet gears, and wherein each of the plurality of compound planet gears is positioned within a respective one of the plurality of bores.

E3.2.1. The planetary gear system of paragraph E3.2, further comprising:

a plurality of bearing elements supported within the plurality of bores between the carrier and the plurality of compound planet gears.

E3.2.2. The planetary gear system of any of paragraphs E3.2-E3.2.1, wherein the at least one radial flange includes an upper radial flange and a lower radial flange, and wherein the plurality of bores includes a plurality of upper bores defined by the upper radial flange and a plurality of lower bores defined by the lower radial flange.

E3.2.2.1. The planetary gear system of paragraph E3.2.2, wherein the upper radial flange is positioned above a/the smallest planet gear stage of each compound planet gear, and wherein the lower radial flange is positioned between a/the larger planet gear stage and a/the smaller planet gear stage of each compound planet gear.

E3.2.2.2. The planetary gear system of any of paragraphs E3.2.2-E3.2.2.1, wherein each compound planet gear includes an upward facing shoulder and a downward facing shoulder positioned below the upward facing shoulder, wherein the upward facing is engaged with a respective one of the plurality of bearing elements and the downward facing shoulder is engaged with a respective one of the plurality of bearing elements to restrict vertical movement of the plurality of compound planet gears relative to the carrier.

E3.2.2.2.1. The planetary gear system of paragraph E3.2.2.2, wherein the upward facing shoulder is positioned above an/the upper gear stage of each compound planet gear, and wherein the downward facing shoulder is positioned below a/the lower gear stage of each compound planet gear.

E4. The planetary gear system of any of paragraphs E-E3.2.2.2.1, further comprising the subject matter of any of paragraphs A-B1.

F. A transmission, comprising:

the planetary gear system of any of paragraphs E-E4;

an input shaft operatively coupled to the non-fixed sun gear;

a first output shaft operatively coupled to the first non-fixed annular gear;

a second output shaft operatively coupled to the second non-fixed annular gear; and a housing operatively coupled to the fixed annular gear;

wherein rotation of the input shaft in a first rotational direction results in rotation of one of the first output shaft and the second output shaft in the first rotational direction and rotation of the other of the first output shaft and the second output shaft in a second rotational direction opposite the first rotational direction.

G. An apparatus, comprising:

a body;

the transmission of paragraph F supported by the body;

an input operatively supported by the body and operatively coupled to the input shaft of the transmission;

a first output operatively coupled to the first output shaft of the transmission; and a second output operatively coupled to the second output shaft of the transmission.

G1. The apparatus of paragraph G, wherein the apparatus is an aircraft, the body includes a fuselage, the input is an engine, the first output is a first rotor or a first propeller, and the second output is a second rotor or a second propeller.

H. A compound gear for use as a planet gear of a planetary gear system, comprising:

a larger planet gear stage having a larger pitch diameter;

a smaller planet gear stage operatively connected to the larger planet gear stage and having a smaller pitch diameter less than the larger pitch diameter; and a smallest planet gear stage fixed to the larger planet gear stage and the smaller planet gear stage and having a smallest pitch diameter less than the smaller pitch diameter;

H1. The compound gear of paragraph H, wherein the larger planet gear stage is a middle gear stage of the compound gear, wherein the smaller planet gear stage is a lower gear stage of the compound gear, and wherein the smallest planet gear stage is an upper gear stage of the compound gear.

H2. The compound gear of any of paragraph H-H1, wherein one of:

the smallest planet gear stage defines a double helical configuration; and the larger planet gear stage defines a double helical configuration.

H3. The compound gear of any of paragraphs H-H2, wherein one of:

the smallest planet gear stage defines a spur configuration or a single helical configuration; and the larger planet gear stage defines a spur configuration or a single helical configuration.

H4. The compound gear of any of paragraphs H-H3, wherein a tooth count of the smaller planet gear stage is (or approximately is) 24, a tooth count of the larger planet gear stage is (or approximately is) 34, and a tooth count of the smallest planet gear stage is (or approximately is) 22.

H5. The compound gear of any of paragraphs H-H4, wherein a pitch diameter of the smaller planet gear stage is (or approximately is) 4.2478, a pitch diameter of the larger planet gear stage is (or approximately is) 5.3671, and a pitch diameter of the smallest planet gear stage is (or approximately is) 3.2124.

H6. The compound gear of any of paragraphs H-H5, wherein a diametral pitch of the smaller planet gear stage is (or approximately is) 5.65 or 6, a diametral pitch of the larger planet gear stage is (or approximately is) 6.3348 or 6, and a diametral pitch of the smallest planet gear stage is (or approximately is) 6.8485 or 6.

H7. The compound gear of any of paragraphs H-H6, further comprising:

an upward facing shoulder configured to support a bearing element; and a downward facing shoulder positioned below the upward facing shoulder and configured to support a bearing element.

H7.1. The compound gear of paragraph H7, wherein the upward facing shoulder is positioned above the smallest planet gear stage, and wherein the downward facing shoulder is positioned below the smaller planet gear stage.

I. A carrier for a planetary gear system, the carrier comprising:

an inner wall; and at least one radial flange extending radially outward from the inner wall, wherein the at least one radial flange defines a plurality of bores configured to receive a corresponding plurality of planet gears.

I1. The carrier of paragraph I, wherein the plurality of bores consists of twelve bores.

I2. The carrier of any of paragraphs I-I1, wherein the at least one radial flange includes an upper radial flange and a lower radial flange, and wherein the plurality of bores includes a plurality of upper bores defined by the upper radial flange and a plurality of lower bores defined by the lower radial flange.

I2.1. The carrier of paragraph I2, wherein the plurality of upper bores consists of twelve bores and the plurality of lower bores consists of twelve bores.

I2.2. The carrier of any of paragraphs I2-I2.1, wherein the carrier is constructed in two parts, including:

an upper portion that includes the upper radial flange and that defines a portion of the inner wall; and a lower portion that includes the lower radial flange and that defines a portion of the inner wall, wherein the lower portion is coupled to the upper portion.

I3. The carrier of any of paragraphs I-I2.2, wherein the inner wall is generally cylindrical and defines a hollow shaft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of systems and other apparatuses disclosed herein are not required to all apparatuses according to the present disclosure, and the present disclosure includes all novel and non-obvious combinations and subcombinations of the various elements disclosed herein. Moreover, one or more of the various elements disclosed herein may define independent inventive subject matter that is separate and apart from the whole of a disclosed apparatus. Accordingly, such inventive subject matter is not required to be associated with the specific apparatuses that are expressly disclosed herein, and such inventive subject matter may find utility in apparatuses that are not expressly disclosed herein.

The invention claimed is:

1. A planetary gear system, comprising:
a plurality of compound planet gears configured to orbit around a primary rotation axis and each including three gear stages;
a first non-fixed annular gear configured to rotate about the primary rotation axis and operatively meshed with one of the three gear stages;
a second non-fixed annular gear configured to rotate about the primary rotation axis and operatively meshed with one of the three gear stages;
a fixed annular gear with a central axis that is coaxial with the primary rotation axis and operatively meshed with one of the three gear stages; and
a non-fixed sun gear configured to rotate about the primary rotation axis and operatively meshed with one of the three gear stages.

2. The planetary gear system of claim 1, wherein the three gear stages include a larger planet gear stage having a larger pitch diameter, a smaller planet gear stage having a smaller pitch diameter less than the larger pitch diameter, and a smallest planet gear stage having a smallest pitch diameter. less than the smaller pitch diameter.

3. The planetary gear system of claim 2, wherein the larger planet gear stage of each compound planet gear is operatively meshed with the first non-fixed annular gear, wherein the smaller planet gear stage of each compound planet gear is operatively meshed with the fixed annular gear and the non-fixed sun gear, and wherein the smallest planet gear stage of each compound planet gear is operatively meshed with the second non-fixed annular gear.

4. The planetary gear system of claim 2, wherein the larger planet gear stage of each compound planet gear is a middle gear stage, wherein the smaller planet gear stage of each compound planet gear is a lower gear stage positioned below the middle gear stage, and wherein the smallest planet gear stage of each compound planet gear is an upper gear stage positioned above the middle gear stage.

5. The planetary gear system of claim 2, wherein one of:
the smallest planet gear stage of each compound planet gear and the second non-fixed annular gear define a double helical gear configuration; and
the larger planet gear stage of each compound planet gear and the first non-fixed annular gear define a double helical gear configuration.

6. The planetary gear system of claim 2, wherein one of:
the smallest planet gear stage of each compound planet gear and the second non-fixed annular gear define a spur gear configuration or a single helical gear configuration; and
the larger planet gear stage of each compound planet gear and the first non-fixed annular gear define a spur gear configuration or a single helical gear configuration.

7. The planetary gear system of claim 2, wherein:
a ratio of a tooth count of the fixed annular gear to a tooth count of the smaller planet gear stage to a tooth count of the non-fixed sun gear approximately is 156:24:108;
a ratio of a tooth count of the first non-fixed annular gear to a tooth count of the larger planet gear stage approximately is 182:34; and
a ratio of a tooth count of the second non-fixed annular gear to a tooth count of the smallest planet gear stage approximately is 182:22.

8. The planetary gear system of claim 2, wherein:
a ratio of a tooth count of the fixed annular gear to a tooth count of the smaller planet gear stage to a tooth count of the non-fixed sun gear is in the range of (110-200):(18-30):(80-150);
a ratio of a tooth count of the first non-fixed annular gear to a tooth count of the larger planet gear stage is in the range of (110-200):(18-40); and
a ratio of a tooth count of the second non-fixed annular gear to a tooth count of the smallest planet gear stage is in the range of (110-200):(20-26).

9. The planetary gear system of claim 2, wherein:
a ratio of a pitch diameter of the fixed annular gear to a pitch diameter of the smaller planet gear stage to a pitch diameter of the non-fixed sun gear approximately is 156:24:108;
a ratio of a pitch diameter of the first non-fixed annular gear to a pitch diameter of the larger planet gear stage approximately is 182:34; and
a ratio of a pitch diameter of the second non-fixed annular gear to a pitch diameter of the smallest planet gear stage approximately is 182:22.

10. The planetary gear system of claim 2, wherein:
a ratio of a pitch diameter of the fixed annular gear to a pitch diameter of the smaller planet gear stage to a pitch diameter of the non-fixed sun gear is in the range of (110-200):(18-30):(80-150);
a ratio of a pitch diameter of the first non-fixed annular gear to a pitch diameter of the larger planet gear stage is in the range of (110-200):(18-40); and
a ratio of a pitch diameter of the second non-fixed annular gear to a pitch diameter of the smallest planet gear stage is in the range of (110-200):(20-26).

11. The planetary gear system of claim 2, wherein a diametral pitch of the smaller planet gear stage approximately is 6, a diametral pitch of the larger planet gear stage approximately is 6, and a diametral pitch of the smallest planet gear stage approximately is 6.

12. The planetary gear system of claim 1, wherein a rotational input to the non-fixed sun gear results in opposite rotational outputs of the first non-fixed annular gear and the second non-fixed annular gear at substantially the same frequency of rotation.

13. The planetary gear system of claim 1, further comprising:
a carrier that interconnects the plurality of compound planet gears.

14. The planetary gear system of claim 13, wherein the carrier does not define an input or an output of the planetary gear system.

15. The planetary gear system of claim 13, wherein the carrier includes an inner wall positioned radially inward from the plurality of compound planet gears, and at least one radial flange extending radially outward from the inner wall, wherein the at least one radial flange defines a plurality of bores corresponding to the plurality of compound planet gears, and wherein each of the plurality of compound planet gears is positioned within a respective one of the plurality of bores.

16. The planetary gear system of paragraph 15, further comprising:
a plurality of bearing elements supported within the plurality of bores between the carrier and the plurality of compound planet gears.

17. The planetary gear system of claim 15, wherein the at least one radial flange includes an upper radial flange and a lower radial flange, and wherein the plurality of bores includes a plurality of upper bores defined by the upper radial flange and a plurality of lower bores defined by the lower radial flange.

18. The planetary gear system of 17, wherein each compound planet gear includes an upward facing shoulder and a downward facing shoulder positioned below the upward facing shoulder, wherein the upward facing shoulder is engaged with a respective one of the plurality of bearing elements and the downward facing shoulder is engaged with a respective one of the plurality of bearing elements to restrict vertical movement of the plurality of compound planet gears relative to the carrier.

19. A transmission, comprising:
the planetary gear system of claim 1;
an input shaft operatively coupled to the non-fixed sun gear;
a first output shaft operatively coupled to the first non-fixed annular gear;
a second output shaft operatively coupled to the second non-fixed annular gear; and
a housing operatively coupled to the fixed annular gear;
wherein rotation of the input shaft in a first rotational direction results in rotation of one of the first output shaft and the second output shaft in the first rotational direction and rotation of the other of the first output shaft and the second output shaft in a second rotational direction opposite the first rotational direction.

20. An apparatus, comprising:
a body;
the transmission of claim 19 supported by the body;
an input operatively supported by the body and operatively coupled to the input shaft of the transmission;
a first output operatively coupled to the first output shaft of the transmission; and
a second output operatively coupled to the second output shaft of the transmission.

21. The apparatus of claim 20, wherein the apparatus is an aircraft, the body is a fuselage, the input is an engine, the first output is a first rotor or a first propeller, and the second output is a second rotor or a second propeller.

22. A compound gear for use as a planet gear of a planetary gear system, comprising:
a larger planet gear stage having a larger pitch diameter, wherein the larger planet gear stage is a middle gear stage of the compound gear;
a smaller planet gear stage operatively connected to the larger planet gear stage and having a smaller pitch diameter less than the larger pitch diameter, wherein the smaller planet gear stage is a lower gear stage of the compound gear; and
a smallest planet gear stage fixed to the larger planet gear stage and the smaller planet gear stage and having a smallest pitch diameter less than the smaller pitch diameter, wherein the smallest planet gear stage is an upper gear stage of the compound gear.

23. A carrier for a planetary gear system, the carrier comprising:
an inner wall; and
at least one radial flange extending radially outward from the inner wall, wherein the at least one radial flange defines a plurality of bores configured to receive a corresponding plurality of planet gears;
wherein the at least one radial flange includes an upper radial flange and a lower radial flange, and wherein the plurality of bores includes a plurality of upper bores defined by the upper radial flange and a plurality of lower bores defined by the lower radial flange.

* * * * *

UNITED STATES PATENT AND TRADEMARK OFFICE
CERTIFICATE OF CORRECTION

| | | |
|---|---|---|
| PATENT NO. | : 9,709,136 B2 | |
| APPLICATION NO. | : 14/721803 | |
| DATED | : July 18, 2017 | |
| INVENTOR(S) | : Scott Hendrik Bouwer, Christopher C. Pierce and Mark Joseph Robuck | |

It is certified that error appears in the above-identified patent and that said Letters Patent is hereby corrected as shown below:

In the Claims

Claim 2, Column 25, Line 26, please remove the "." after "diameter".

Claim 16, Column 26, Line 60, please change "paragraph" to "claim".

Claim 18, Column 27, Line 4, please add --claim-- after "of" and before "17".

Signed and Sealed this
Third Day of April, 2018

Andrei Iancu
*Director of the United States Patent and Trademark Office*